(12) United States Patent
Hernandez et al.

(10) Patent No.: US 9,756,840 B1
(45) Date of Patent: *Sep. 12, 2017

(54) TROLLING ASSEMBLY

(71) Applicants: John M. Hernandez, Miami, FL (US); Adolfo Martinez, Hialeah, FL (US)

(72) Inventors: John M. Hernandez, Miami, FL (US); Adolfo Martinez, Hialeah, FL (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/453,041

(22) Filed: Aug. 6, 2014

(51) Int. Cl.
*A01K 91/08* (2006.01)
*A01K 91/053* (2006.01)
*A01K 91/06* (2006.01)

(52) U.S. Cl.
CPC ............ *A01K 91/08* (2013.01); *A01K 91/053* (2013.01); *A01K 91/06* (2013.01)

(58) Field of Classification Search
CPC .............................. A01K 91/08; A01K 91/053
USPC ... 43/27.4, 43.13, 43.12, 44.87, 44.9, 44.91, 43/21.2; 114/255, 364
See application file for complete search history.

(56) References Cited

U.S. PATENT DOCUMENTS

| | | | | | |
|---|---|---|---|---|---|
| 2,612,712 | A * | 10/1952 | Kruze | ................... | A01K 91/08 43/21.2 |
| 3,008,259 | A * | 11/1961 | Zornes | ................... | A01K 91/08 43/43.12 |
| 3,032,912 | A * | 5/1962 | Bengtsson | ............. | A01K 91/08 43/43.13 |
| 3,091,050 | A * | 5/1963 | Metzler | ................... | A01K 95/00 43/44.91 |
| 3,104,488 | A * | 9/1963 | Hicks | ..................... | A01K 91/06 43/44.91 |
| 3,193,964 | A * | 7/1965 | Hurst | ..................... | A01K 91/08 43/43.12 |
| 3,733,734 | A * | 5/1973 | Hysaw | ................... | A01K 93/00 43/44.9 |
| 3,740,706 | A * | 6/1973 | Joseph | ................... | H04B 11/00 310/337 |
| 3,874,109 | A * | 4/1975 | Peterson | ............... | A01K 85/14 43/42.22 |
| 3,874,110 | A * | 4/1975 | Larson | ................... | A01K 91/08 43/43.12 |
| 3,941,072 | A * | 3/1976 | Caton | ................... | B63H 25/382 114/165 |
| 3,955,305 | A * | 5/1976 | Roberts | ................. | A01K 95/00 43/44.91 |
| 3,961,437 | A * | 6/1976 | Lewis | ................... | A01K 91/08 43/43.12 |

(Continued)

*Primary Examiner* — Darren W Ark
(74) *Attorney, Agent, or Firm* — Albert Bordas, P.A.

(57) ABSTRACT

A trolling assembly structured to protect at least a portion of a fishing line from water-borne debris while trolling in a body of water from a boat includes a first positioning assembly attached to the boat and being adjustable to facilitate positioning the portion of the fishing line in a first predetermined spaced relation to the boat, and a second positioning assembly interconnected to the first positioning assembly and being positionable to facilitate positioning the portion of the fishing line in a second predetermined spaced relation to the boat. The trolling assembly also includes a shield assembly, interconnected to the second positioning assembly, which is structured to releasably retain the portion of the fishing line below a surface of the body of water while trolling, and to protect at least the portion of the fishing line from water-borne debris while trolling.

12 Claims, 10 Drawing Sheets

(56) References Cited

U.S. PATENT DOCUMENTS

| | | | | |
|---|---|---|---|---|
| 3,968,587 A | * | 7/1976 | Kammeraad | A01K 91/08 43/27.4 |
| 3,989,216 A | * | 11/1976 | Veatch | G10K 11/004 248/278.1 |
| 4,044,489 A | * | 8/1977 | Henze | A01K 91/08 43/27.4 |
| 4,069,611 A | * | 1/1978 | Dusich | A01K 91/08 43/43.12 |
| 4,161,078 A | * | 7/1979 | Pagani | A01K 91/08 43/43.13 |
| 4,173,091 A | * | 11/1979 | Emory, Jr. | A01K 91/08 43/43.12 |
| 4,221,068 A | * | 9/1980 | Roemer, Jr. | A01K 91/08 43/43.12 |
| 4,248,002 A | * | 2/1981 | McNellis | A01K 91/08 43/27.4 |
| 4,279,092 A | * | 7/1981 | Hutson | A01K 95/00 43/44.91 |
| 4,417,414 A | * | 11/1983 | Hood | A01K 91/08 43/43.12 |
| 4,486,970 A | * | 12/1984 | Larson | A01K 91/08 43/43.13 |
| 4,520,589 A | * | 6/1985 | Lummis | A01K 91/08 43/27.4 |
| 4,538,372 A | * | 9/1985 | Petigoretz | A01K 91/08 43/27.4 |
| 4,598,493 A | * | 7/1986 | O'Brien | A01K 97/24 43/44.9 |
| 4,610,409 A | * | 9/1986 | Emory, Jr. | A01K 91/08 43/27.4 |
| 4,615,135 A | * | 10/1986 | Swinbanks | A01K 91/03 43/43.13 |
| 4,619,070 A | * | 10/1986 | Jung | A01K 91/08 43/43.13 |
| 4,716,674 A | * | 1/1988 | Kammeraad | A01K 91/08 43/27.4 |
| 4,750,288 A | * | 6/1988 | Brennan | A01K 91/08 43/43.12 |
| 4,813,171 A | * | 3/1989 | Cooper | A01K 91/08 43/27.4 |
| 4,813,172 A | * | 3/1989 | McCue | A01K 91/08 43/43.12 |
| 4,852,292 A | * | 8/1989 | Pease | A01K 91/03 43/27.4 |
| 4,928,420 A | * | 5/1990 | Jackson | A01K 91/08 43/27.4 |
| 4,948,083 A | * | 8/1990 | McNaney, Jr. | A01K 91/08 43/21.2 |
| 5,018,296 A | * | 5/1991 | Putz, II | A01K 91/08 43/43.12 |
| 5,033,226 A | * | 7/1991 | Jackson | A01K 91/08 43/43.12 |
| 5,137,249 A | * | 8/1992 | Royster | B63B 35/71 248/231.61 |
| 5,170,581 A | * | 12/1992 | Lyons | A01K 97/125 43/27.4 |
| 5,301,451 A | * | 4/1994 | VanAssche | A01K 91/08 43/27.4 |
| 5,428,920 A | * | 7/1995 | Levin | A01K 95/00 43/44.91 |
| 5,445,102 A | * | 8/1995 | Rupp | B63B 35/14 43/27.4 |
| 5,457,909 A | * | 10/1995 | Graves | A01K 95/00 43/44.91 |
| 5,461,821 A | * | 10/1995 | Carter, Jr. | A01K 95/00 43/43.12 |
| 5,611,167 A | * | 3/1997 | Mills | A01K 91/08 43/43.13 |
| 5,941,009 A | * | 8/1999 | Aas | A01K 91/18 114/255 |
| 6,065,420 A | * | 5/2000 | Smith | G10K 11/006 114/364 |
| 6,405,670 B1 | * | 6/2002 | Desantis | B63C 1/10 114/364 |
| 6,408,779 B1 | * | 6/2002 | Roy | A01K 91/08 43/43.12 |
| 6,505,431 B1 | * | 1/2003 | Christian | A01K 91/08 43/43.12 |
| 6,591,541 B1 | * | 7/2003 | Cummings | A01K 97/10 43/21.2 |
| 6,658,784 B1 | * | 12/2003 | Mastropaolo | A01K 91/08 43/43.13 |
| 6,668,745 B2 | * | 12/2003 | Slatter | A01K 91/08 114/255 |
| 6,684,558 B1 | * | 2/2004 | Gillespie | A01K 91/08 43/27.4 |
| 6,918,203 B2 | * | 7/2005 | Robichaud | A01K 77/00 114/255 |
| 6,978,570 B1 | * | 12/2005 | Clark | A01K 91/08 43/27.4 |
| 7,007,906 B2 | * | 3/2006 | Slatter | A01K 91/08 43/21.2 |
| 7,036,451 B1 | * | 5/2006 | Hutchinson | B63B 17/00 114/364 |
| 7,143,541 B2 | * | 12/2006 | Buero | A01K 91/08 43/27.4 |
| 7,296,377 B2 | * | 11/2007 | Wilcox | A01K 97/10 43/27.4 |
| 7,380,365 B2 | * | 6/2008 | Noraker | A01K 85/01 43/43.13 |
| 7,698,850 B2 | * | 4/2010 | Harris | A01K 97/01 43/4 |
| 7,941,964 B2 | * | 5/2011 | Stanton | A01K 97/10 43/21.2 |
| 7,971,839 B2 | * | 7/2011 | Upchurch | B63B 25/002 248/121 |
| 7,984,582 B2 | * | 7/2011 | Brinker | A01K 91/08 43/43.12 |
| 8,109,034 B1 | * | 2/2012 | McCauley | A01K 87/02 43/27.4 |
| 8,819,986 B2 | * | 9/2014 | Bennis | A01K 91/03 43/44.87 |
| 8,826,584 B1 | * | 9/2014 | Hernandez | A01K 91/08 43/27.4 |
| 2004/0244270 A1 | * | 12/2004 | Brinker | A01K 91/08 43/43.13 |
| 2006/0213113 A1 | * | 9/2006 | Emory | A01K 91/08 43/43.13 |
| 2007/0119089 A1 | * | 5/2007 | Nicholson | A01K 91/08 43/27.4 |
| 2007/0163484 A1 | * | 7/2007 | Eng | B63B 27/143 114/364 |
| 2008/0011218 A1 | * | 1/2008 | Smith | B63B 17/00 114/364 |
| 2008/0053361 A1 | * | 3/2008 | Nicholson | A01K 91/08 114/364 |
| 2009/0188151 A1 | * | 7/2009 | Bartholomew | A01K 93/00 43/44.91 |
| 2010/0005702 A1 | * | 1/2010 | Palacios Cortell | A01K 91/08 43/27.4 |
| 2010/0223834 A1 | * | 9/2010 | Osborn | A01K 91/08 43/43.13 |
| 2011/0083355 A1 | * | 4/2011 | Wilcox | A01K 91/08 43/27.4 |
| 2012/0017490 A1 | * | 1/2012 | Wessner | A01K 91/08 43/43.12 |

* cited by examiner

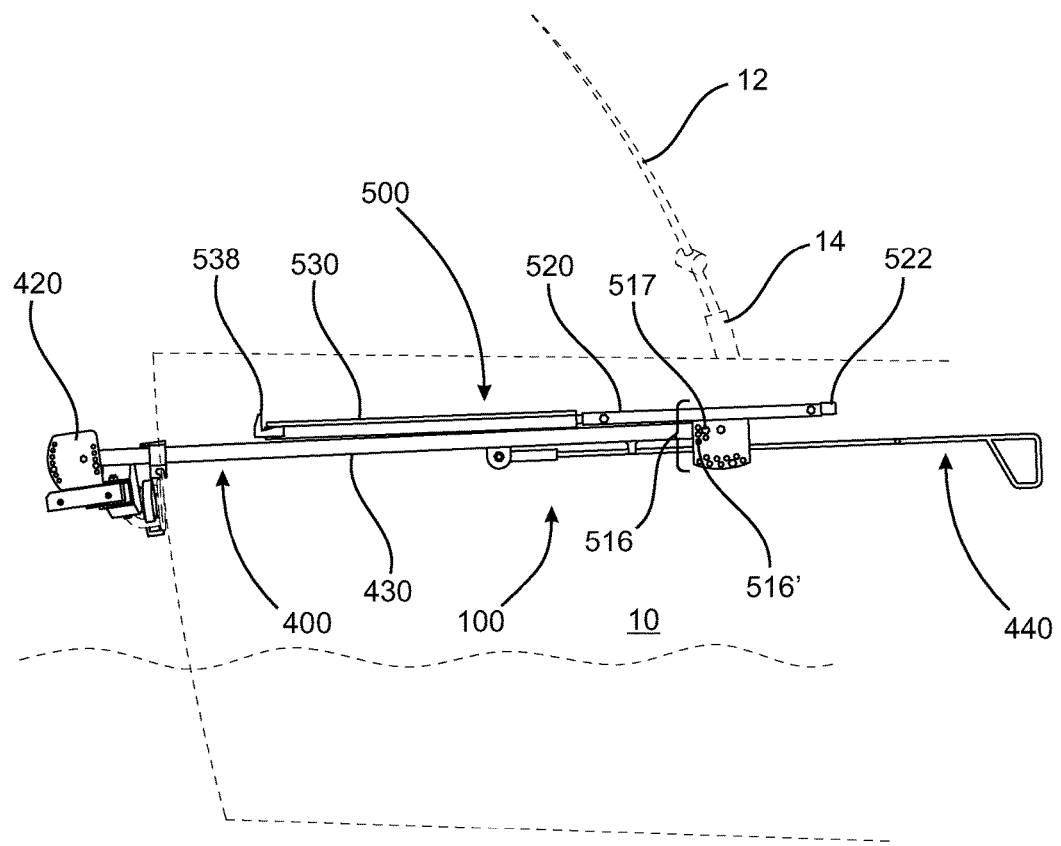
FIG. 9
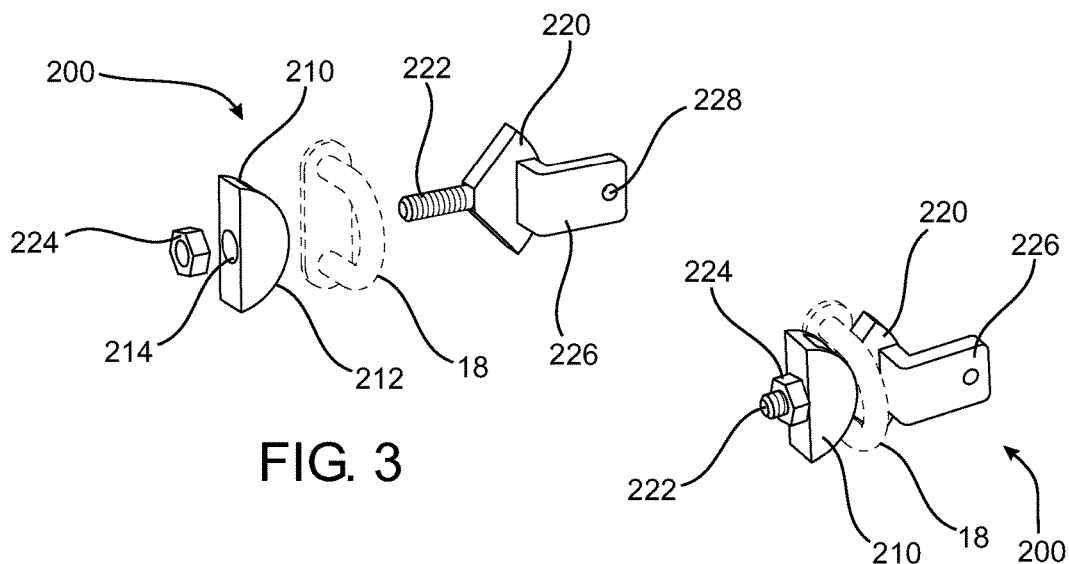
FIG. 3
FIG. 3A

TROLLING ASSEMBLY

BACKGROUND

The present disclosure is directed to a trolling assembly structured to increase trolling efficiency. More in particular, the present disclosure is directed to a trolling assembly mounted to a boat or other aquatic craft and selectively positionable in relation thereto. Furthermore, the trolling assembly in accordance with the present disclosure is structured to releasably retain and protect a fishing line from water-borne debris, such as seaweed, while trolling, while allowing the line to freely release from the assembly upon the strike of a fish. The present trolling assembly allows for prolonged trolling by eliminating the need to stop and remove debris which typically becomes entangled in the fishing line while trolling a bait or lure in open water.

DESCRIPTION OF THE RELATED ART

Trolling is a method of fishing in which a bait or lure is drawn through the water at a relatively high speed, typically, off the back or sides of a moving boat. It is a popular technique in recreational and commercial fishing which lends itself to the use of multiple fishing lines at once. Moreover, trolling from a boat is a useful technique for catching large game in open water, such as mahi mahi or dolphin, tuna, marlin, sailfish, wahoo, etc., which do not frequent the shallow waters along the coastline. There are, however, some significant drawbacks to trolling.

A common problem encountered while trolling is that all fishable bodies of water contain some form of plant matter, such as algae, leaves, weeds, as well as other water-borne debris. While trolling, regardless of placement of the fishing line relative to the boat, these water-borne materials can become wrapped around and entangled with the portion of the fishing line disposed near the surface of the water. This in turn impedes the efficiency of the trolling, and may reduce the likelihood of successfully landing a fish that has taken the bait or lure. Therefore, when water-borne debris becomes entangled with the fishing line, a fisherman must stop trolling, which may require stopping the boat, reeling the line while removing the debris, and resetting the line before trolling can resume. This process may be further complicated depending on the type and number of fishing lines deployed at the same time. And since entanglement is often a persistent and frequent occurrence, it can significantly reduce the amount of time actually spent trolling, which detracts from the enjoyment of the fishing experience when a person or persons are trolling for sport or recreation.

Another issue presented while trolling is that as a boat moves through the water, it creates a wake behind it, which increases in size proportional to the speed of the boat. A fishing line used to deploy a lure or bait for trolling behind a moving boat is therefore disposed in a turbulent wake zone. This turbulence often results in erratic, and often undesirable, movement of the lure or bait through the water, which may actually deter a potential game fish from striking the same. For example, the bait or lure, which is preferably trolled in a steady even motion near the surface of the water, may be tossed about and jostled in an erratic fashion by the turbulent forces in the wake, and may in fact move so erratically as to prevent a fish from striking.

One resolution to the problems presented by the wake of the boat is to simply reduce the speed of the boat while trolling. Although this does diminish the magnitude of the wake and the turbulence it creates, this does not always, in and of itself, generate a corresponding increase in strikes, as this tactic may result in the bait or lure moving too slowly and/or evenly. Slower speeds do not, however, resolve the issue of water-borne debris engaging and becoming entangled in the fishing line during the trolling process.

Another attempt to resolve these problems involves the use of a downrigger to which the fishing line is releasably attached and subsequently suspended well beneath the surface of the water, where the impact of the wake is, at best, negligible. Of course, not all desired species of fish feed at the depths normally attained via a downrigger, and while a downrigger may be useful for catching bottom-dwelling fish, many of the most desirable species of game fish, such as sailfish, mahi mahi, wahoo, tuna, etc., feed in the upper reaches of the water column. Furthermore, the use of a downrigger fails to resolve the issue of water-borne debris becoming entangled in at least the portion of the fishing line near the surface, where the majority of the water-borne debris of concern is found.

Yet another attempt to resolve the problems associated with trolling is by way of an outrigger which is structured and disposed to laterally position a fishing line, such that the line enters the water off the side of the boat, rather than behind it in a wake zone. While outriggers are effective in positioning a fishing line outside of the wake zone and near the surface of the body of water, if multiple lines are being trolled simultaneously from the same side of the boat, which is a common practice, the lines are highly susceptible to becoming entangled while trolling. In addition, as with the foregoing strategies, the use of outriggers does not resolve the issue of water-borne debris becoming entangled in the fishing line while trolling.

When fishing for certain species of game fish, such as wahoo, higher trolling speeds, in the range of 10 to 20 knots, are desired to attract these large fish and encourage them to strike. In order to maintain a bait or lure below the water surface at these higher speeds, the bait or lure is attached to a long steel "guitar" leader having a "cigar" weight attached at one end, the weight being in the range of 2 to 6 pounds. The steel "guitar" leader is required because standard monofilament fishing line will stretch and contract excessively under the weight of the "cigar" at the speed at which it is being trolled, such that is not suitable for this type of application. The other end of the "guitar" leader is attached to the standard monofilament fishing line, and the entire assembly is fed into the water and trolled behind the boat at high speed. While the "cigar" weight, and the weight of the "guitar" leader itself help maintain the bait or lure below the surface of the water while trolling at higher speeds, they necessarily interfere with the normal action of the bait or lure, as well as the operation of the fishing rod and reel. More in particular, once a fish has taken the bait or lure and the monofilament fishing line is reeled in to the point where the "guitar" leader is accessible from the boat, the fish must be pulled into the boat via the "guitar" leader, either manually or with the assistance of a small winch assembly.

Therefore, there is a need for an assembly which facilitates trolling a bait or lure attached to a fishing line from a boat in a more efficient manner. Specifically, there is a need for an assembly which permits selective positioning of a fishing line relative to a course of a boat while trolling, as well as to selectively position the fishing line at a predetermined depth, while serving to deflect water-borne debris which may otherwise become entangled with the fishing line while trolling. There is also a need for an assembly which allows high speed trolling of a bait or lure utilizing a fishing rod and reel with standard monofilament fishing line.

SUMMARY

As previously indicated, the present disclosure is directed to a trolling assembly structured to protect at least a portion of a fishing line from water-borne debris while trolling in a body of water from a boat. The trolling assembly includes a first positioning assembly structured to be attached to the boat which, in at least one embodiment, is accomplished by way of a universal mount assembly removably secured to a portion of the boat, to which the first positioning assembly is then interconnected. The first positioning assembly is adjustable to facilitate positioning a portion of a fishing line in a first predetermined spaced relation relative to a boat. More in particular, the first positioning assembly is structured to be adjustable in a generally vertical direction relative to a surface of the water, such that a first arm of the first positioning assembly may be raised or lowered relative to the water. Furthermore, in at least one embodiment, the overall length of the first positioning assembly is adjustable via cooperatively structured and interconnected first and extension arms.

The trolling assembly of the present disclosure further comprises a second positioning assembly which is structured and disposed in an interconnected relation to the first positioning assembly. Like the first positioning assembly, the second positioning assembly is also positionable, however, the second positioning assembly is structured to facilitate positioning the portion of the fishing line in a second predetermined spaced relation relative to the boat. Specifically, the second positioning assembly is structured to be positioned in a generally side to side direction, such that a second arm of the second positioning assembly may be positioned closer to or farther away from the side of the boat on which the trolling assembly is deployed. Additionally, the second positioning assembly includes a support member which is structured to facilitate adjustment of the second arm of the second positioning assembly in either a deployed or retracted position, via a deployment positioning array and a retraction positioning array, and corresponding deployment and retraction stops, respectively.

The trolling assembly in accordance with the present disclosure further comprises a shield assembly which is operatively interconnected to the second positioning assembly. In one embodiment, the shield assembly comprising a shield mechanism structured to releasably retain the portion of the fishing line below a surface of the body of water while trolling. Further, the shield mechanism is structured to protect at least the portion of the fishing line from water-borne debris while trolling, thereby preventing the interference of such debris entangled in the fishing line while fighting a fish, as well as eliminating the need to stop and clear the fishing line of such debris while trolling. A further advantage of the present trolling assembly is that, by virtue of the shield assembly protecting the line, it is possible to troll a lure or bait at relatively high speeds, e.g., 10 to 20 knots, using standard monofilament line without imparting erratic action to the bait. As noted above, these higher trolling speeds have been found to be very effective in attracting certain species of game fish, such as wahoo. Furthermore, the present assembly permits trolling at such higher speeds without the need for a heavy weight to maintain the lure or bait below the surface of the water, and as a result, standard, lighter weight, monofilament fishing line may be employed in this high speed trolling application. Trolling at such higher speeds without negatively impacting the action of the bait or lure, or interfering with the normal operation of the rod and reel itself for the entirety of the time one is landing a fish, is not possible utilizing heretofore known trolling mechanisms which require heavy weights and/or heavy steel long leaders to maintain the bait or lure in position below the surface of the water.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 3 is an exploded perspective view of one illustrative embodiment of a universal mount assembly in accordance with the present disclosure.

FIG. 3A is a perspective view of the universal mount assembly of FIG. 3 removably mounted to an attachment member secured to a boat.

FIG. 9 is a side elevation of the embodiment of the trolling assembly of FIG. 6 disposed in a retracted position.

Like reference numerals refer to like parts throughout the several views of the drawings.

DETAILED DESCRIPTION

As stated above, the present disclosure is directed to a trolling assembly, generally indicated as 100, structured to releasably retain at least a portion of a fishing line below the surface of a body of water and protect the submerged portion of the fishing line from water-borne debris while trolling a lure or bait.

Figure 1:
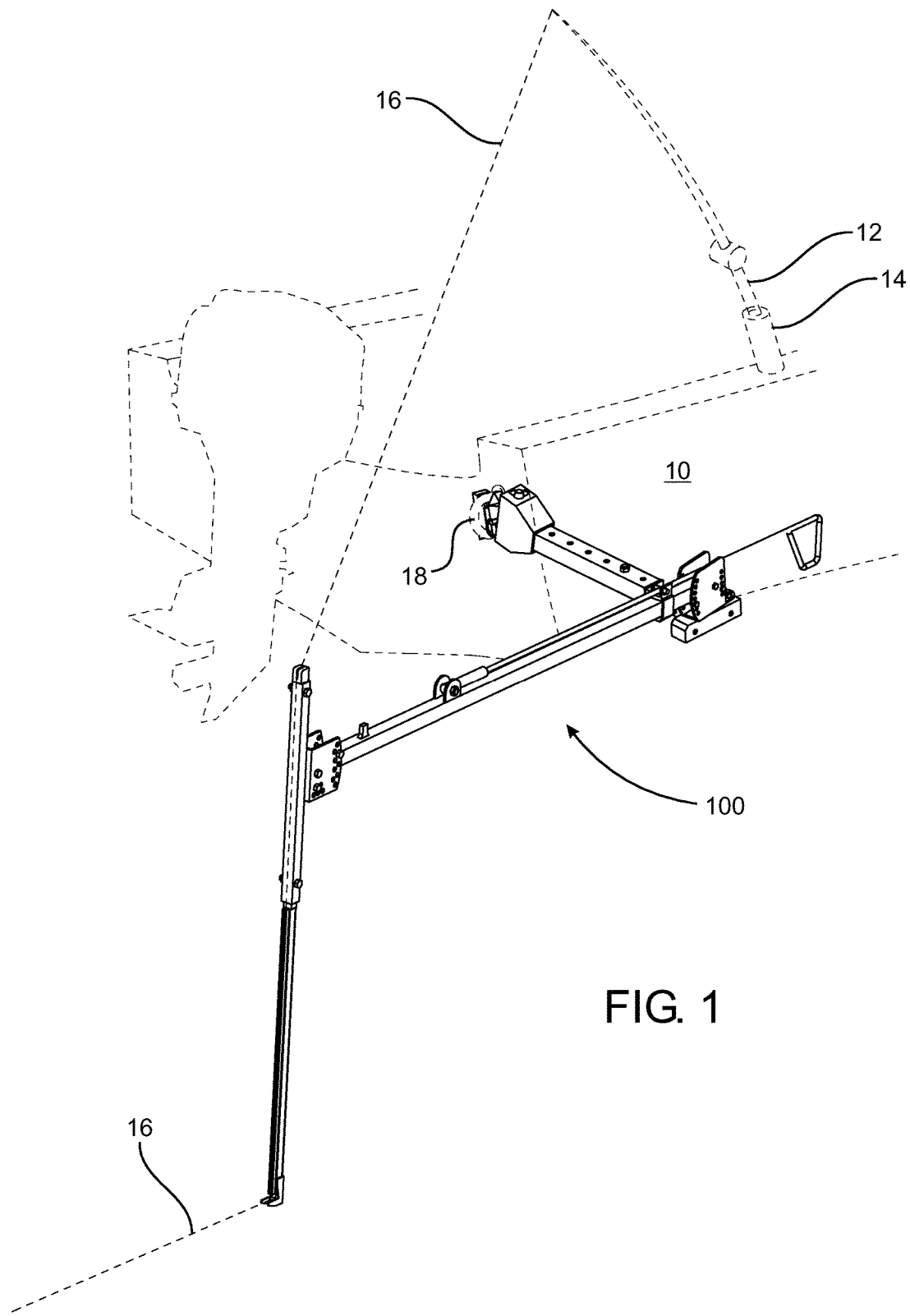
FIG. 1 is a perspective view of one illustrative embodiment of a trolling assembly in accordance with the present disclosure disposed in an operative position relative to a boat.

FIG. 1 depicts one embodiment of a trolling assembly 100 in accordance with the present disclosure disposed in an operative position in relation to a boat 10. The trolling assembly 100 is structured to guide at least a portion of a fishing line 16, such as may be fed out from a fishing rod 12, into the water at a preselected position relative to the course of the boat 10. The trolling assembly 100 is further structured to releasably retain the portion of the fishing line 16 at a predetermined depth beneath the surface of the water while trolling. The fishing rod 12 may be hand held by a fisherman inside the boat 10 or it may be supported within a rod holder 14 or other device suitable for supporting a fishing rod 12 while trolling, as is depicted in FIG. 1.

Figure 2:
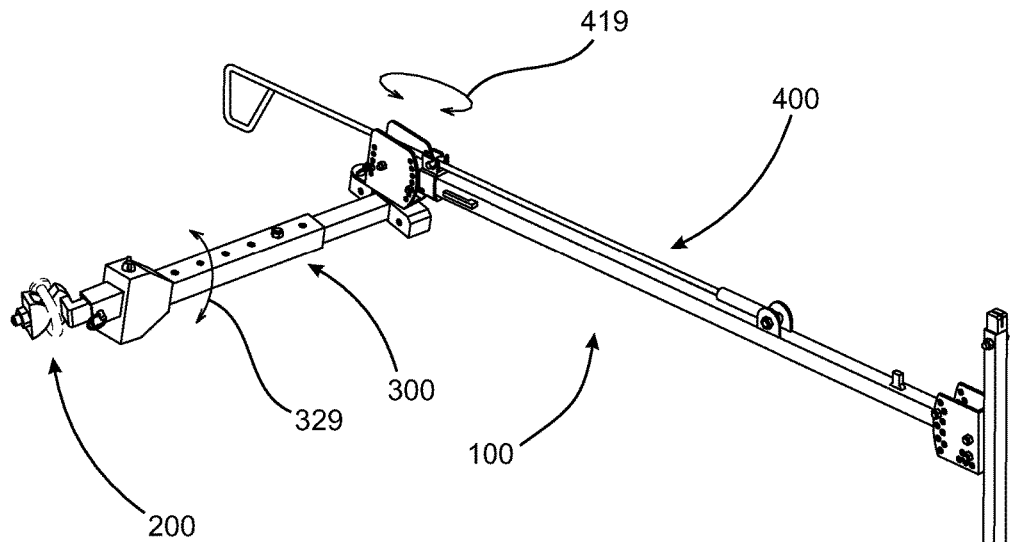
FIG. 2 is a perspective view of the embodiment of the trolling assembly of FIG. 1 rotated to display the opposite side.

In at least one embodiment, the trolling assembly 100 of the present disclosure is attached to the boat 10 via an attachment member 18 or other structure of the boat 10 that is suitable for attachment of ancillary devices thereto. As illustrated in FIG. 2, at least one embodiment of the trolling assembly 100 includes a universal mount assembly 200 which is structured to be removably mounted or secured to the boat 10.

The trolling assembly 100 also has a first positioning assembly 300 which, in at least one embodiment, is interconnected to the universal mount assembly 200. This first positioning assembly 300 is adjustable to facilitate positioning of the fishing line 16 in a first predetermined spaced relation to the boat 10 when the trolling assembly 100 is attached to a boat. Specifically, the first positioning assembly 300 is positionable in a generally vertical direction, as shown by first directional arrow 329 in FIG. 2, into each of a plurality of operable orientations.

The trolling assembly 100 further comprises a second positioning assembly 400 interconnected to the first positioning assembly 300. The second positioning assembly 400 is also adjustable or positionable to further facilitate selective positioning of at least a portion of the fishing line 16 in a second predetermined spaced relation to the boat 10. In the illustrative embodiment of FIG. 5, the second positioning assembly 400 is disposable into a plurality of operative positions as illustrated by second directional arrow 419.

Also as shown throughout the figures, the trolling assembly 100 comprises a shield assembly 500 interconnected to a portion of the second positioning assembly 400. The shield assembly 500 is the portion of the trolling assembly 100 which breaks the surface of the water and extends to a predetermined depth at which point the portion of the fishing line 16 is deployed for trolling. Furthermore, the shield assembly 500 releasably retains and protects the portion of the fishing line 16 from water-borne debris while trolling, as is described in greater detail below.

Now that the overall structure of a trolling assembly 100 in accordance with the present disclosure has been briefly introduced and described, the specific components of such a trolling assembly 100 will be explained in detail.

To begin, FIGS. 3 and 3A illustrate one embodiment of a universal mount assembly 200 in accordance with the present disclosure. Specifically, FIG. 3 illustrates an exploded perspective view of the universal mount assembly 200, whereas FIG. 3A shows the universal mount assembly 200 in an operative position, securely yet removably mounted to an attachment member 18 which is secured to a portion of a boat 10. The universal mount assembly 200, in at least one embodiment, comprises a base 210 structured to engage at least a portion of the attachment member 18, permitting secure yet releasable attachment thereto. More in particular, and as best shown in the illustrative embodiment of FIGS. 3 and 3A, the base 210 comprises an arcuate surface 212 which engages one side of the attachment member 18, however, it is understood to be within the scope and intent of the present disclosure to provide a base 210 which comprises other shapes or configurations, so long as the shape permits removably mounting or securing the universal mount assembly 200 to an attachment member 18 or similar structure of a boat 10. As shown in FIG. 3A, the arcuate surface 212 of the base 210 abuts and engages the attachment member 18, and the base 210 further comprises a securing aperture 214 which is structured and dimensioned to engage a portion of a mounting member 220 of the universal mount assembly 200.

As noted above, the universal mount assembly 200 further includes a mounting member 220 which, in at least one embodiment, comprises an interconnect 222 that is cooperatively structured and disposed to engage the securing aperture 214 of the base 210. More in particular, in at least one embodiment, the interconnect 222 is structured to pass through a portion of the attachment member 18 of the boat 10, then through the securing aperture 214 of the base 210 thereof in order to facilitate removably mounting to the boat 10. Additionally, a fastener 224 is provided to secure the mounting member 220 to the base 210, and a as result, to the attachment member 18 or other such structure of the boat 10. Specifically, the fastener 224 is structured to securely engage the interconnect 222, such as is illustrated by way of example only in FIG. 3A. For instance, the fastener 224 and interconnect 222 may be structured to matingly fit one another, such as by male-female components, or through threaded engagement, such as shown in FIGS. 3 and 3A wherein the fastener 224 comprises a nut and the interconnect 222 comprises a threaded post. It will be appreciated that the base 210 and mounting member 220 may be mounted to the attachment member 18 via other appropriate means, such as clips or other releasable fasteners, which enable the secure yet removable attachment of the universal mount assembly 200 to the boat 10.

In at least one embodiment, the universal mount assembly 200 further comprises a mounting section 226 which is structured and disposed for interconnection with the first positioning assembly 300, as discussed in further detail below. FIGS. 3 and 3A illustrate one embodiment of a mounting member 220 comprising a mounting section 226 which extends outwardly therefrom to engage a portion of the first positioning assembly 300 for attachment thereto. In at least one embodiment, the mounting section 226 comprises a mounting aperture 228 utilized to facilitate the secure yet removable attachment of the first positioning assembly 300 to the universal mount assembly 200, such as by placing or securing a pin, bolt, screw, or other fastener therethrough. However, it will be appreciated that the first positioning assembly 300 may be mounted or attached to the mounting section 226 by other known mechanical fastening techniques as well.

Figure 13:
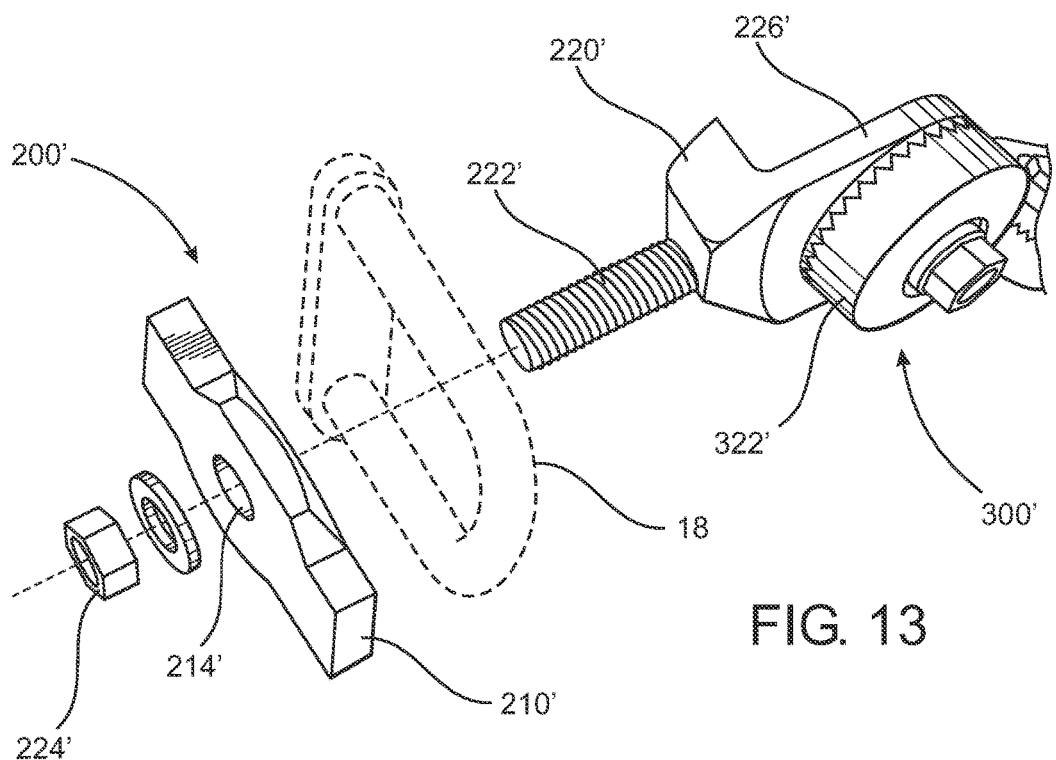
FIG. 13 is an exploded perspective view of another illustrative embodiment of a universal mount assembly in accordance with the present disclosure.

FIG. 13 illustrates an exploded perspective view of one alternate embodiment of a universal mount assembly 200' in accordance with the present invention. The universal mount assembly 200', in at least one embodiment, comprises a base 210' structured to engage at least a portion of an attachment member 18, such as may be affixed to a boat, permitting secure yet releasable attachment thereto. More in particular, the base 210' abuts and engages the attachment member 18, and the base 210' further comprises a securing aperture 214' which is structured and dimensioned to engage a portion of a mounting member 220' of the universal mount assembly 200'.

As noted above, the universal mount assembly 200' further includes a mounting member 220' which, in at least one embodiment, comprises an interconnect 222' that is cooperatively structured and disposed to engage the securing aperture 214' of the base 210'. More in particular, in at least one embodiment, the interconnect 222' is structured to pass through a portion of the attachment member 18 then through the securing aperture 214' of the base 210' in order to facilitate removably mounting to the boat. Additionally, a fastener 224' is provided to secure the mounting member 220' to the base 210', and a as result, to the attachment member 18 or other such structure of the boat. The fastener 224' and interconnect 222', in at least one embodiment, are structured to matingly fit one another, such as by male-female components, or through threaded engagement, such as shown in FIG. 13, wherein the fastener 224' comprises a nut and the interconnect 222' comprises a threaded post. It will be appreciated that the base 210' and mounting member 220' may be mounted to the attachment member 18 via other appropriate means, such as clips or other releasable fasteners, which enable the secure yet removable attachment of the universal mount assembly 200' to the boat.

Figure 15:
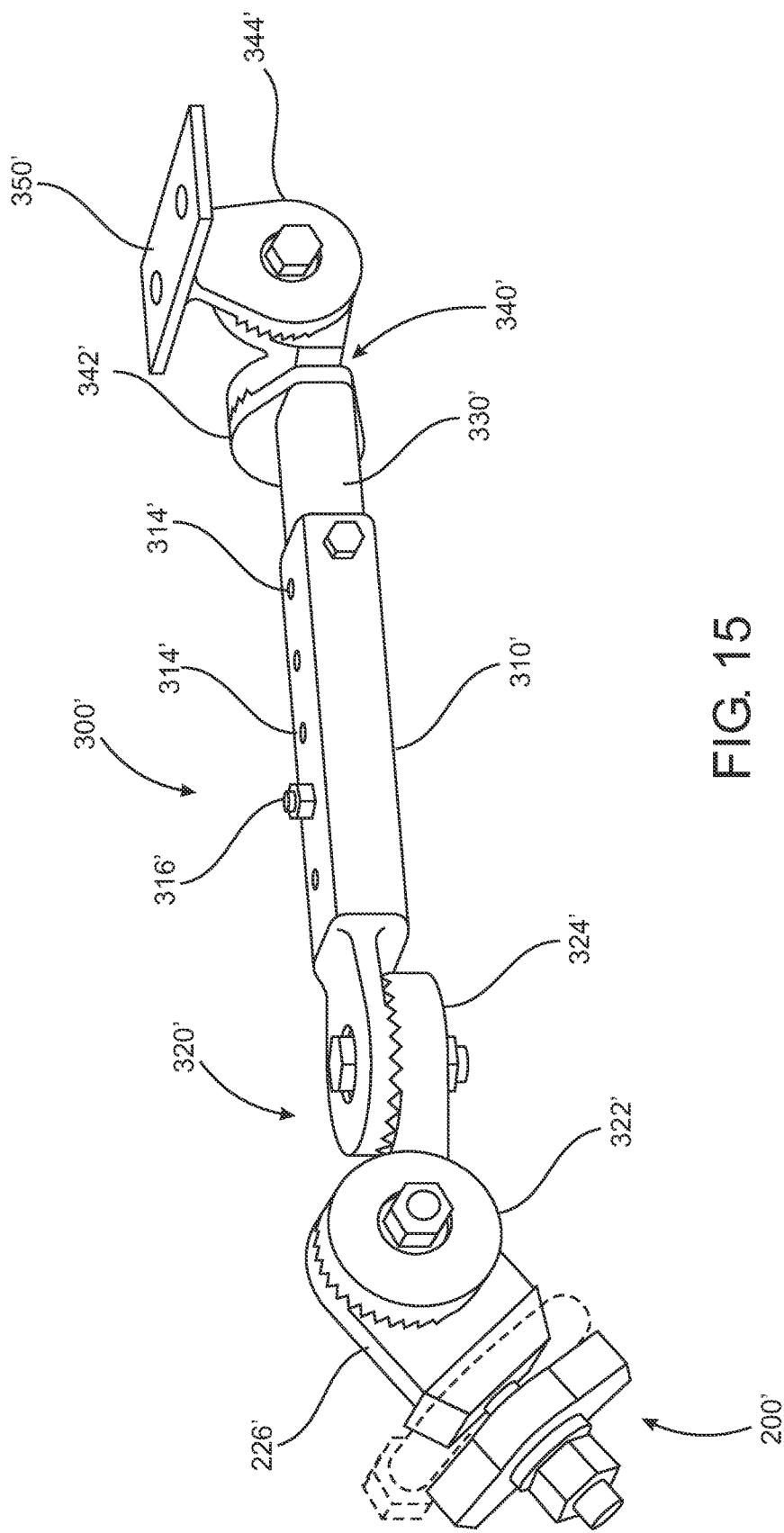
FIG. 15 is a perspective view of another illustrative embodiment of a universal mount assembly and a first positioning assembly in accordance with the present disclosure.

In at least one embodiment, the universal mount assembly 200' further comprises a mounting section 226' which is structured and disposed for interconnection with the first positioning assembly 300', as discussed in further detail below. FIG. 13 illustrates one embodiment of a mounting member 220' comprising a mounting section 226' which extends outwardly therefrom to engage a portion of the first positioning assembly 300' for attachment thereto, as shown in FIG. 15, and as discussed hereinafter.

Figure 14:
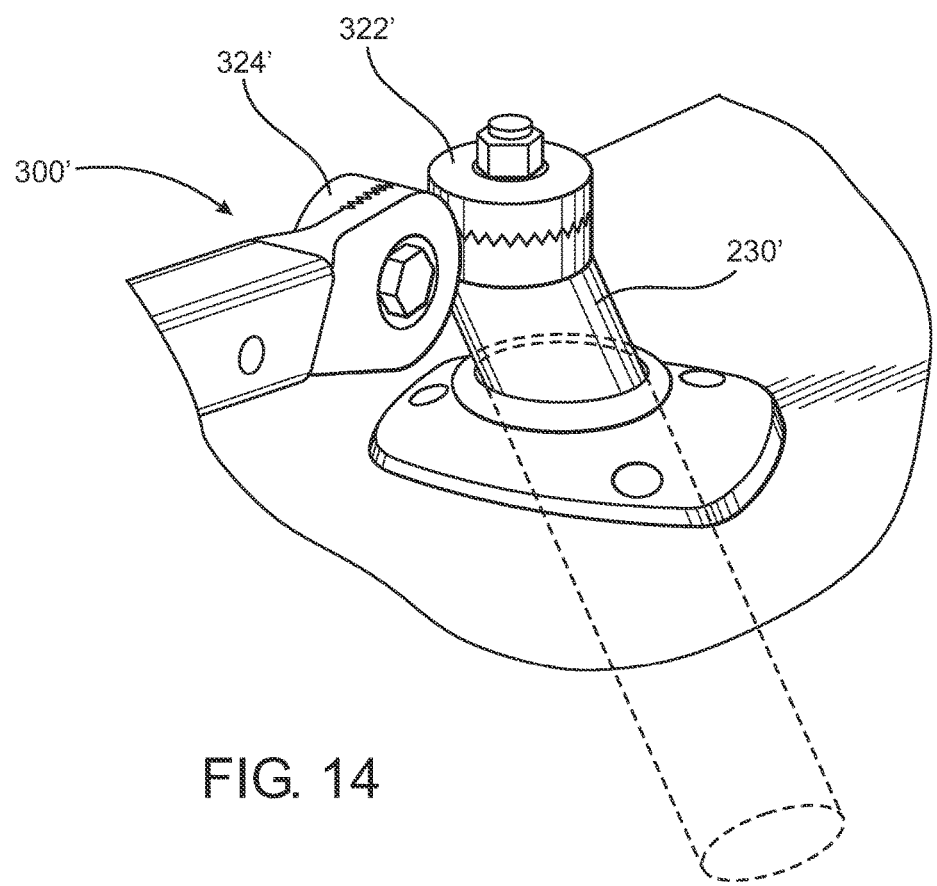
FIG. 14 is a partial perspective view of one illustrative embodiment of a universal mount assembly comprising a rod holder adapter in accordance with the present disclosure.

FIG. 14 presents a further illustrative embodiment of mounting assembly in accordance with the present invention. More in particular, FIG. 14 illustrates a rod holder mount 230' having an angled post dimensioned to fit into a rod holder of a boat. A mount adjustment mechanism 322' of a first positioning assembly 300' is attached to one end of the rod holder mount 230', as shown in FIG. 14. Further a first arm adjustment mechanism 324' is interconnected to the mount adjustment mechanism 322', thereby permitting the first positioning assembly 300' to be disposed in virtually any position relative to the rod holder mount 230', in the manner described below with respect to FIG. 15.

Figure 4:
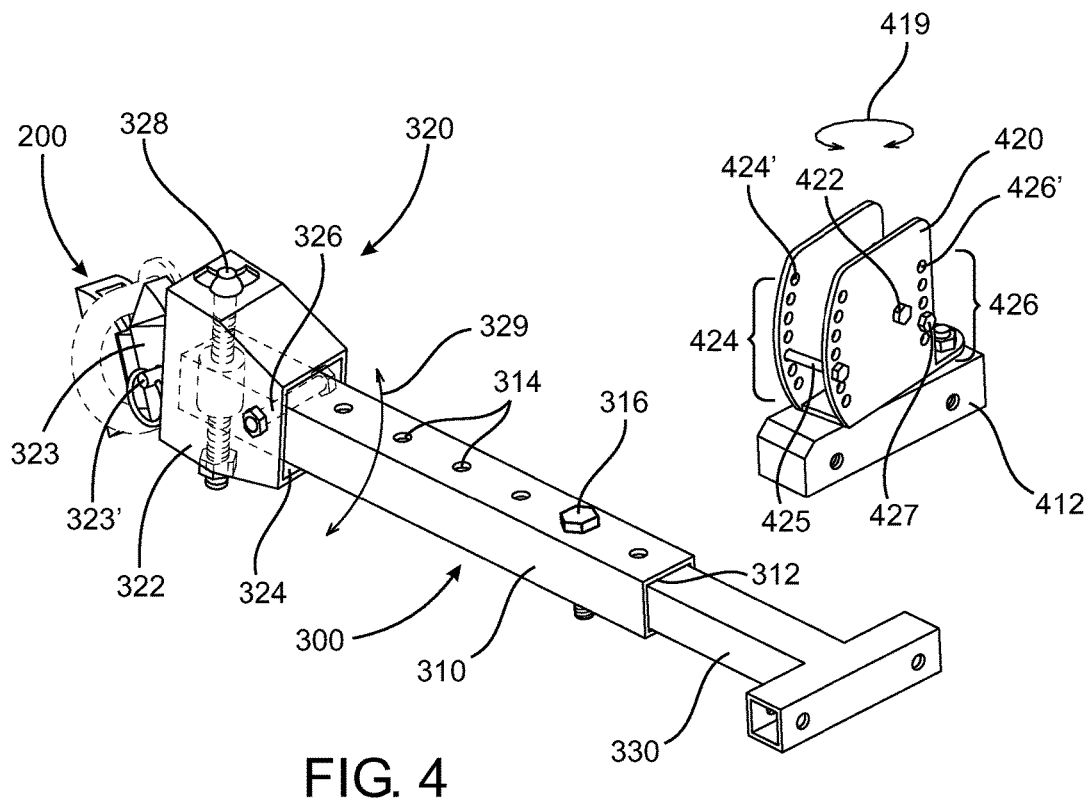
FIG. 4 is a partially exploded perspective view of one illustrative embodiment of a first positioning assembly and a support member in accordance with the present disclosure.

Turning next to FIG. 4, the trolling assembly 100 also comprises a first positioning assembly 300 which is adjustable to facilitate positioning a portion of the fishing line 16 in a first predetermined spaced relation to the boat 10. In at least one embodiment, the first positioning assembly 300 is releasably attached to the universal mount assembly 200 which is itself removably mounted to the boat 10 via attachment member 18. More in particular, the first positioning assembly 300 comprises an adjustment mechanism 320, which includes a body 322 having a mounting portion 323 attached thereto. The mounting portion 323 is structured to securely engage the mounting section 226 of the universal mount assembly 200. A mounting pin 323' or similar fastener is provided to facilitate the secure engagement of the mounting portion 323 of the body 322 to the mounting section 226. In the embodiment depicted in FIG. 4, the mounting pin 323' is structured to pass through the mounting portion 323 of the body 322 of the adjustment mechanism 320 and into and through the mounting aperture 228 of the mounting member 220, in order to releasably attach the first positioning assembly 300 to the universal mount assembly 200.

The body 322 of the adjustment mechanism 320 is further structured to comprise an at least partially hollow configuration having an open end 324, which is disposed opposite the mounting portion 323, as shown in the illustrative embodiment of FIG. 4. The body 322 and the open end 324 thereof are cooperatively structured to receive at least a portion of a first arm 310 therein and, as illustrated in the embodiment of FIG. 4, the portion of the first arm 310 is moveably interconnected to the body 322 via first pivot member 326. As such, the first arm 310 is positionable into a plurality of operable orientations in a generally vertical direction as shown by the first directional arrow 329. Moreover, the open end 324 of the body 322 is structured and dimensioned to be at least the size and dimension of the portion of the first arm 310 extending therein, and, in at least one embodiment, the open end 324 of the adjustment mechanism 320 has a greater transverse dimension than that of the portion of the first arm 310 extending therein, such that the first arm 310 may be disposed into a plurality of operable orientations in a generally vertical position as shown by first directional arrow 329 about an axis of the first pivot member 326.

In at least one embodiment, the adjustment mechanism 320 further comprises an actuator 328 structured and disposed to operatively engage at least the portion of the first arm 310 extending into the open end 324 of the body 322, the actuator 328 being operable to position and maintain the first arm 310 in each of a plurality of different operable orientations. More in particular, the actuator 328 is structured to engage and move the portion of the first arm 310 extending into the open end 324 of the body 322, such that operation of the actuator 328 effectively positions the first arm 310 into each of the plurality of different operative orientations or positions. In at least one embodiment, and as depicted in FIG. 4, the actuator 328 comprises an elongate member or bolt which passes through a portion of the body 322 of the adjustment mechanism 320 and is interconnected thereto. As is also shown in FIG. 4, the actuator 328 further comprises an engagement member on the opposite side of the body 322 such as a wing nut as is also shown. Further, the actuator 328 may comprise a positioning member structured to engage at least a portion of the first arm 310, the positioning member being disposed along the elongate member or bolt, such that operation of the engagement member moves the positioning member along the bolt. Thus, operation of the actuator 328 affects the positioning of the portion of the first arm 310 within the body 322. This is but one illustrative example of the actuator 328 in accordance with the present disclosure, and is not an exclusive description thereof. Indeed, the actuator 328 can comprise other mechanisms to position and maintain the first arm 310 of the first positioning assembly 300 in each of a plurality of operable orientations.

As noted above, in at least one embodiment, the body 322 comprises a first pivot member 326 which engages the portion of the first arm 310 extending into the open end 324 of the body 322. The first arm 310 is moveably interconnected to the first pivot member 326 such that the first arm 310 pivots about and axis of the first pivot member 326 when being adjusted or positioned via the actuator 328.

More in particular, when the actuator 328 is operated, the portion of the first arm 310 disposed in the body 322 moves. For example, as shown in FIG. 4, when the actuator 328 is operated, the portion of first arm 310 is moved up or down by the movement of the positioning member along the bolt. The first pivot member 326 provides a pivot point for the movement of the first arm 310, so that when the portion of the first arm 310 disposed within the body 322 is moved in one direction, the first arm 310 pivots about the first pivot member 326 such that the portion of the first arm 310 opposite the first pivot member 326 moves in an opposite direction. Moreover, and as noted above, the open end 324 of the body 322 is dimensioned to permit movement of the first arm 310, i.e., when the first arm 310 is positionable in a generally vertical direction, as depicted by first directional arrow 329 in FIG. 4, the open end 324 comprises a larger vertical dimension than the portion of the first arm 310 extending therein, to allow unimpeded movement of the first arm 310.

Figure 5:
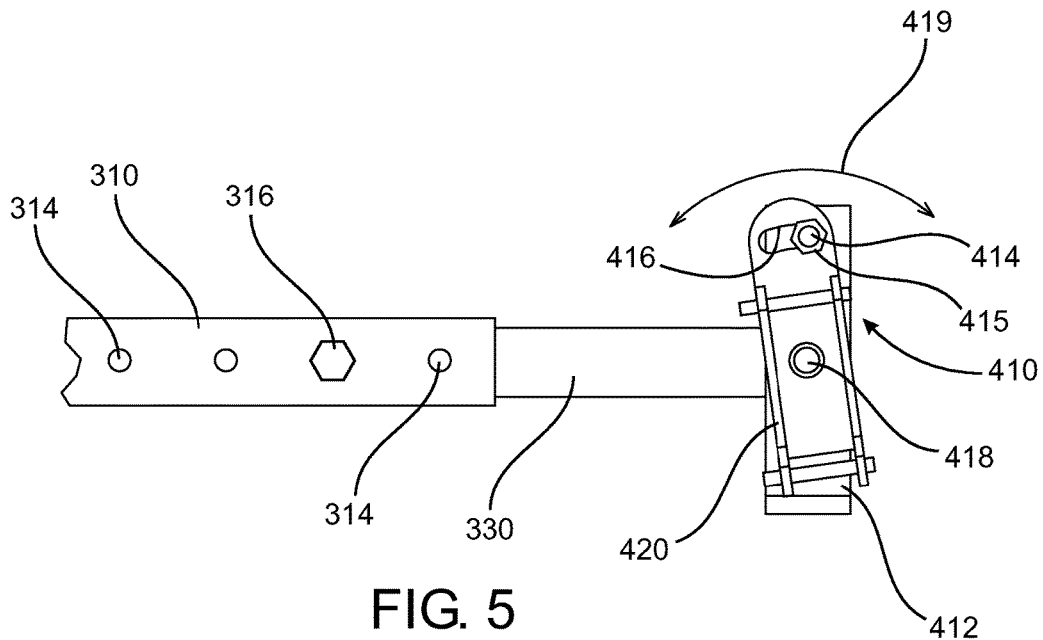
FIG. 5 is a partial top plan view of the first positioning assembly and support member illustrated in FIG. 4.

Furthermore, as trolling may be accomplished from a variety of boats having a wide range of different sizes and dimensions, FIGS. 4 and 5 illustrate an embodiment of a first positioning assembly 300 comprising a first arm 310 and an extension arm 330 cooperatively structured to permit adjustment of an overall length of the first positioning assembly 300. In at least one embodiment, as shown in FIG. 4, the extension arm 330 is structured to telescopically engage the first arm 310 to allow adjustment of the overall length of the first positioning assembly 300. By way of example only, the first arm 310 may comprise an extension channel 312 therein which is structured and dimensioned to receive at least a portion of the extension arm 330 therein. However, it is within the scope and intent of the present disclosure that the extension arm 330 be movably interconnected to the first arm 310 in any manner which permits adjustment of the overall length of the first positioning assembly 300.

In order to secure the first arm 310 and the extension arm 330 to one another to define a desired, predetermined overall length, a plurality of extension apertures 314 are provided along the first positioning assembly 300, as illustrated in the figures. These extension apertures 314 may be utilized in conjunction with one or more extension fastener 316 to secure the first arm 310 and extension arm 330 at a given, predetermined length. As shown best in FIGS. 4 and 5, the extension fastener 316 is dimensioned to fit through an extension aperture 314 as well as through at least a portion of the extension arm 330 in order to fix or secure the extension arm 330 in a given location with respect to the first arm 310. Accordingly, the first positioning assembly 300 is positionable in not only a generally vertical direction, as shown by first directional arrow 329, but also along the length thereof via the extension arm 330. This flexibility allows the trolling assembly 100 of the present disclosure to be disposed into any of a plurality of different operable orientations relative to a boat 10 while trolling.

FIG. 15 is illustrative of another embodiment of a first positioning assembly 300' in accordance with the present invention. The first positioning assembly 300' comprises a first arm 310' and an extension arm 330' cooperatively structured to permit adjustment of an overall length of the first positioning assembly 300'. In at least one embodiment, as shown in FIG. 15, the extension arm 330' is structured to telescopically engage the first arm 310' to allow adjustment of the overall length of the first positioning assembly 300'. By way of example only, the first arm 310' may comprise an extension channel (not shown) structured and dimensioned to receive at least a portion of the extension arm 330' therein. However, it is within the scope and intent of the present disclosure that the extension arm 330' be movably interconnected to the first arm 310' in any manner which permits adjustment of the overall length of the first positioning assembly 300'.

In order to secure the first arm 310' and the extension arm 330' to one another to define a desired, predetermined overall length, a plurality of extension apertures 314' are provided along the first positioning assembly 300', as illustrated in FIG. 15. These extension apertures 314' may be utilized in conjunction with one or more extension fastener 316' to secure the first arm 310' and extension arm 330' at a given, predetermined length. The extension fastener 316', in at least one embodiment, is dimensioned to fit through an extension aperture 314' as well as through at least a portion of the extension arm 330' in order to fix or secure the extension arm 330' in a given location with respect to the first arm 310'. Accordingly, the first positioning assembly 300' is positionable along the length thereof via the extension arm 330'.

FIG. 15 further illustrates the alternate universal mount assembly 200', as illustrated in FIG. 13, attached to a portion of the first positioning assembly 300', and more in particular, to one end of the first arm 310' thereof. As shown in the illustrative embodiment of FIG. 15, the first positioning assembly 300' comprises a first adjustment assembly 320' attached to one end of the first arm 310'. More in particular, the first adjustment assembly 320' comprises a mount adjustment mechanism 322' which facilitates the interconnection of the first arm 310' to a portion of the universal mount assembly 200', and in particular, to the mounting section 226' of the universal mount assembly 200'. Further, and as will be appreciated from FIG. 15, the mount adjustment mechanism 322' is adjustable a full 360 degrees in either direction, in equally spaced increments. More in particular, and in accordance with the illustrative embodiment of FIG. 15, the mount adjustment mechanism 322' comprises a ratchet mount having interlocking teeth on adjacent circular surfaces which allows positioning of the surfaces a full 360 degrees relative to one another.

FIG. 15 further illustrates that the first positioning assembly 320' comprises a first arm adjustment mechanism 324' attached to a portion of the mount adjustment mechanism 322', such that the mount adjustment mechanism 322' and the first arm adjustment mechanism 324' are disposed essentially perpendicular to one another. The first arm adjustment mechanism 322' also comprises a ratchet mount, and as such, is also adjustable a full 360 degrees in either direction, in equally spaced increments. As will be appreciated by those of skill in the art, this arrangement of ratchet mounts essentially perpendicular to one another permits positioning of the first arm 310' of the first positioning assembly 300' in essentially any position relative to the mounting section 226' of the universal mount assembly 200', and therefore, in essentially any position relative to a boat to which the universal mount assembly 200 is mounted.

Looking further to the illustrative embodiment of FIG. 15, the first positioning assembly 300' comprises a second adjustment assembly 340' attached to one end of the extension arm 330'. The second positioning assembly 320' comprises an extension arm adjustment mechanism 342' which facilitates the interconnection of the extension arm 330' to an interface 350', wherein the interface 350' permits the second positioning assembly 400 to be mounted to the first positioning assembly 300'. Further, and as will again be appreciated from FIG. 15, the extension arm adjustment mechanism 342' also comprises a ratchet mount which allows positioning a full 360 degrees. FIG. 15 further illustrates that the second positioning assembly 340' comprises an interface adjustment mechanism 344' attached to the extension arm adjustment mechanism 342', and as before, an angle of about 90 degrees is formed therebetween. The extension arm adjustment mechanism 342' also comprises a ratchet mount, and as such, is also adjustable a full 360 degrees in either direction, in equally spaced increments. As will be appreciated by those of skill in the art, this arrangement of ratchet mounts essentially perpendicular to one another permits positioning of the extension arm 330' of the first positioning assembly 300' in essentially any position relative to the interface 350'. Therefore, the second positioning assembly 400 may be disposed in essentially any position relative to the first positioning assembly 300', and as a result, in essentially any position relative to a boat to which it is mounted. This flexibility allows the trolling assembly 100 of the present disclosure to be disposed into a virtually unlimited number of different operable orientations relative to a boat 10 while trolling.

The trolling assembly 100 further comprises a second positioning assembly 400 which is interconnected to the first positioning assembly 300, and is positionable to facilitate positioning a portion of the fishing line 16 in a second predetermined spaced relation to the boat 10. As shown in the illustrative embodiment of the figures, the second positioning assembly 400 includes an alignment assembly 410, which is structured to position a second arm 430 of the second positioning assembly 400 into each of a plurality of different operative positions. With specific reference to FIG. 5, the alignment assembly 410 is structured to move along the path of a second directional arrow 419 which, as shown, is disposed in a generally horizontal plane. More importantly, movement of the alignment assembly 410 along the path of the second directional arrow 419 allows the fishing line 16 to be positioned closer to or farther from the side of the boat 10, and the corresponding wake zone created by the boat 10.

In at least one embodiment, the alignment assembly 410 comprises a base member 412 interconnected to a support member 420. The base member 412 is structured to interconnect the second positioning assembly 400 to the first positioning assembly 300. As illustrated in FIG. 5, the base member 412 is removably attached to one end of the extension arm 330, however, it is understood that the base member 412 may be attached to another portion of the first positioning assembly 300.

The base member 412 of the alignment assembly 410 as shown in the embodiment of FIGS. 4 and 5, is disposed in a supporting relation to the support member 420, which is movably interconnected thereto. This configuration allows the support member 420 to be positioned into each of a plurality of positions along the path of the second directional arrow 419. In at least one embodiment, the alignment assembly 410 comprises an alignment member 414 which extends upwardly from the base member 412 through an alignment channel 416 in the support member 420. As shown in FIG. 5, a moveable interconnect 418 is utilized to interconnect the support member 420 to the base member 412, the moveable interconnect 418 being disposed a distance apart from the alignment channel 416 so as to act as a pivot point for positioning the support member 420 along the path of the second directional arrow 419. In the illustrative embodiment of FIG. 5, the moveable interconnect 418 allows the support member 420 to move in a generally angular direction. Once a predetermined or desired position is attained, a securing member 415 is fastened to the alignment member 414 such that the support member 420 is securely yet releasably locked in position.

Returning to FIG. 4, the support member 420 of the second positioning assembly 400 includes a deployment positioning array 424 which comprises a plurality of deployment apertures 424' and a deployment stop 425. The deployment stop 425 is selectively positionable through corresponding pairs of the deployment apertures 424' and is structured and disposed to facilitate the disposition of a second arm 430 of the second positioning assembly 400 into each of a plurality of operative positions. The support member 420, in at least one embodiment, further comprises a retraction positioning array 426 that includes a plurality of retraction apertures 426' and a retraction stop 427. The retraction stop 427 is selectively positionable through corresponding pairs of the retraction apertures 426' and is structured and disposed to facilitate disposition of the second arm 430 into each of a plurality of retracted positions.

More specifically, as the second arm 430 of the second positioning assembly 400 is moved between an operative position and a retracted position, as described in further detail below with reference to FIGS. 6 through 9, the deployment stop 425 prevents movement of the second arm 430 beyond a preselected deployment position and thereby at least partially defines an operative position. Similarly, the retraction positioning array 426 and the retraction stop 427 are utilized to restrict movement of the second arm 430 beyond a preselected retraction position when retracted. The deployment stop 425 and retraction stop 427 can be positioned anywhere along their respective positioning arrays 424 or 426, in order to "custom fit" the trolling assembly 100 to a particular boat 10. Moreover, as shown in the figures, the second arm 430 is moveable between the deployment stop 425 and retraction stop 427, via a second pivot member 422. Accordingly, movement of the second arm 430 is permitted between the deployment stop 425 and the retraction stop 427 along a continuous path therebetween.

Figure 6:
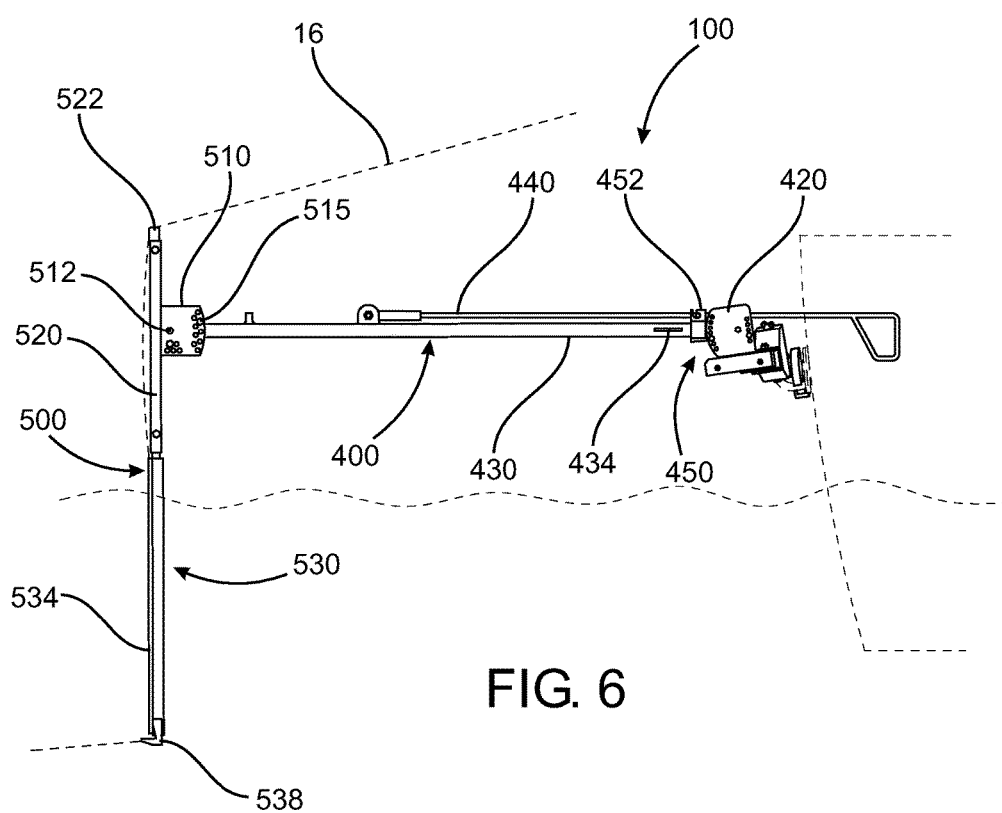
FIG. 6 is a side elevation of one illustrative embodiment of a trolling assembly in accordance with the present disclosure disposed in an operative position relative to a boat.
Figure 7:
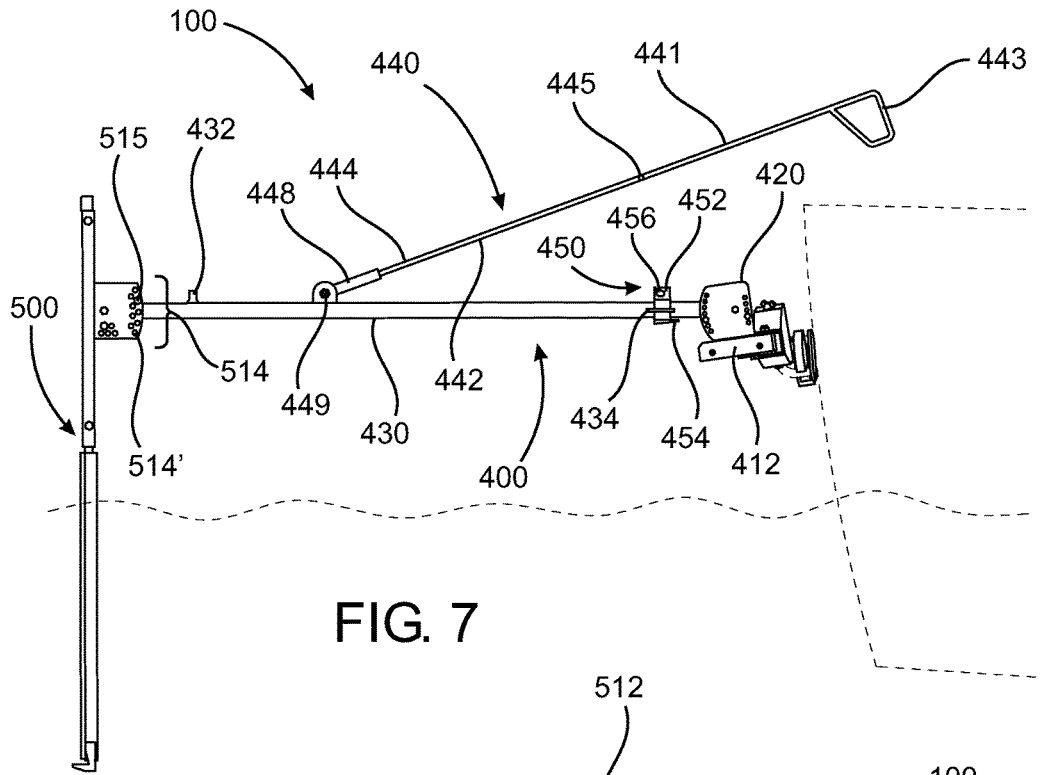
FIG. 7 is a side elevation of the embodiment of the trolling assembly of FIG. 6 illustrating one illustrative embodiment of a deployment mechanism operatively positioned for retraction of the trolling assembly from the body of water.

Turning now to FIG. 6, and as noted above, the second positioning assembly 400 also comprises a second arm 430. The second arm 430 is disposable into each of a plurality of different operative positions, one of which is shown in FIG. 6, each operative position being at least partially defined by the interaction of the second arm 430 with the deployment stop 425 of the support member 420. Further, and as shown in the illustrative embodiment of FIGS. 6 and 7, the second positioning assembly 400 also comprises a locking mechanism 450. The locking mechanism 450 is structured to releasably yet securely maintain the second arm 430 in at least one operative position while trolling. More in particular, the locking mechanism 450 comprises a locking member 452 which is movable along at least a portion of the second arm 430. As shown in FIG. 7, the locking member 452 comprises a locking tongue 454 which is structured to engage a portion of the deployment stop 425 when disposed in an operative locked orientation, as illustrated best in FIG. 6. As such, the deployment stop 425 is sandwiched between the second arm 430 and the locking tongue 454, thereby securely yet releasably maintaining the second arm 430 in the preselected operative position for trolling. As illustrated best in FIG. 7, the locking member 452 is retained in position by a retention clip 434 attached to a portion of the second arm 430, when disposed in an unlocked orientation.

In at least one embodiment, the second positioning assembly 400 further comprises a deployment mechanism 440 which is operative to dispose the second arm 430 between at least one retracted position and at least one operative position. The deployment mechanism 440 comprises a retention pin 445 which is structured to engage a retention channel 456 of the locking member 452 and retain the locking member 452 in the operative locked orientation while trolling. More in particular, the deployment mechanism 440 comprises a deployment arm 441 attached at a distal end 444 to a biasing mechanism 448 which imparts an outward force on the deployment arm 441 sufficient to maintain the retention pin 445 in position in the retention channel 456 of the locking member 452, when the deployment arm 441 is disposed in the operative locked orientation as illustrated in FIG. 6.

Figure 10:
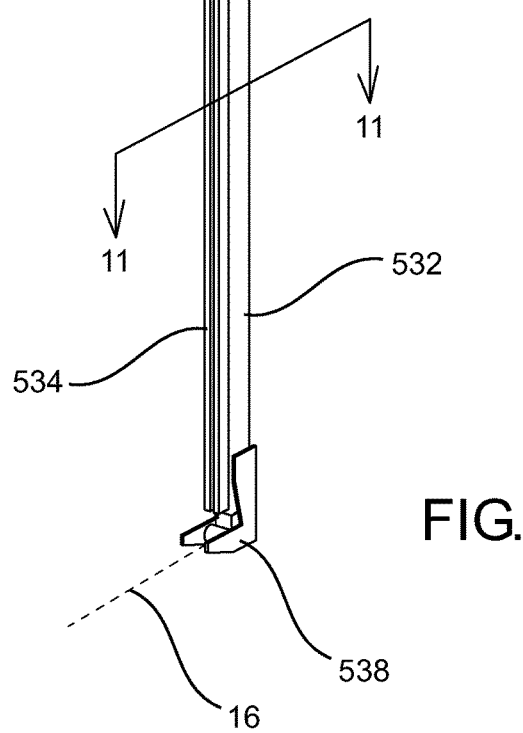
FIG. 10 is a perspective view of one illustrative embodiment of a shield assembly of a trolling assembly in accordance with the present disclosure.
Figure 11:
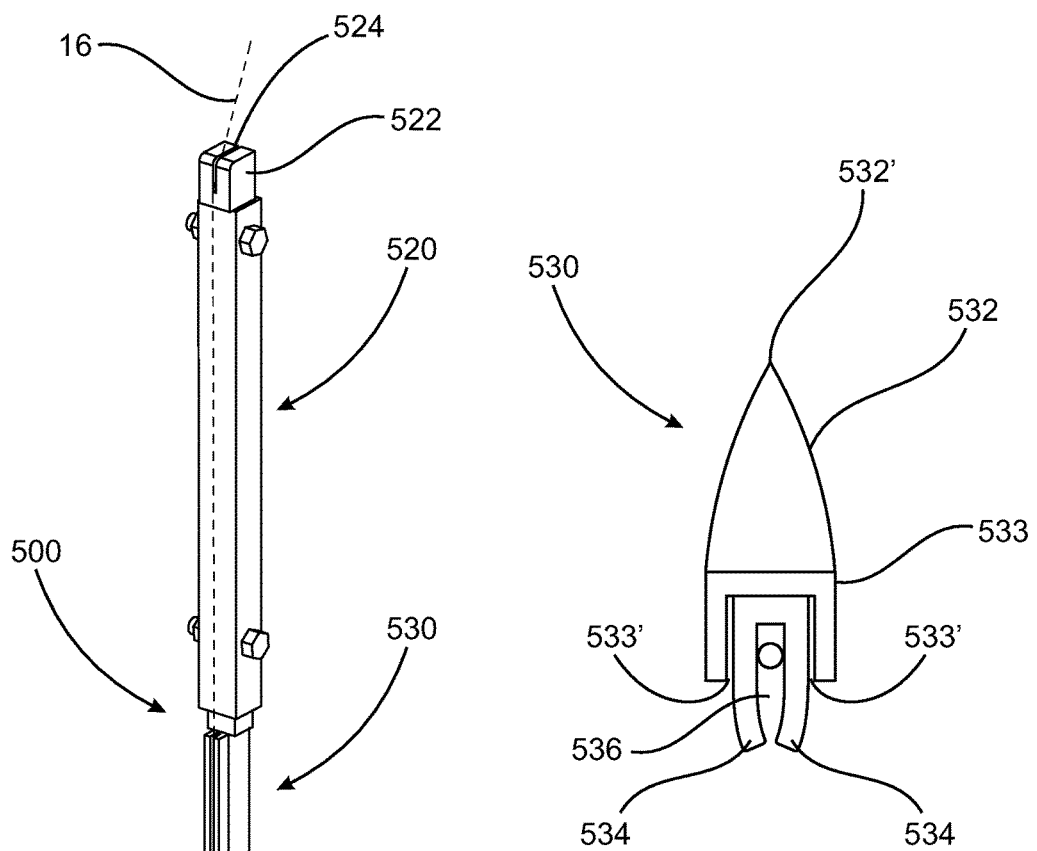
FIG. 11 is a cross-section of the shield assembly of FIG. 10 along line 11-11 thereof.

Also as shown in FIG. 6, the trolling assembly 100 further includes a shield assembly 500. The shield assembly 500 comprises an interconnection mechanism 510 structured to interconnect the shield assembly 500 to the second positioning assembly 400. Further, the shield assembly 500 includes a shield deployment arm 520 which is attached to the interconnection mechanism 510 and is structured to extend in a generally downward direction towards the surface of the water. As shown in FIGS. 6, 10, and 11, the shield assembly 500 further comprises a shield mechanism 530 attached to the shield deployment arm 520 that is structured to releasably retain at least a portion of a fishing line 16 below the surface of the body of water. Furthermore, the shield mechanism 530 is structured to protect the portion of the fishing line 16 from water-borne debris while trolling a bait or lure attached to the fishing line 16 in a body of water.

Figure 6A:
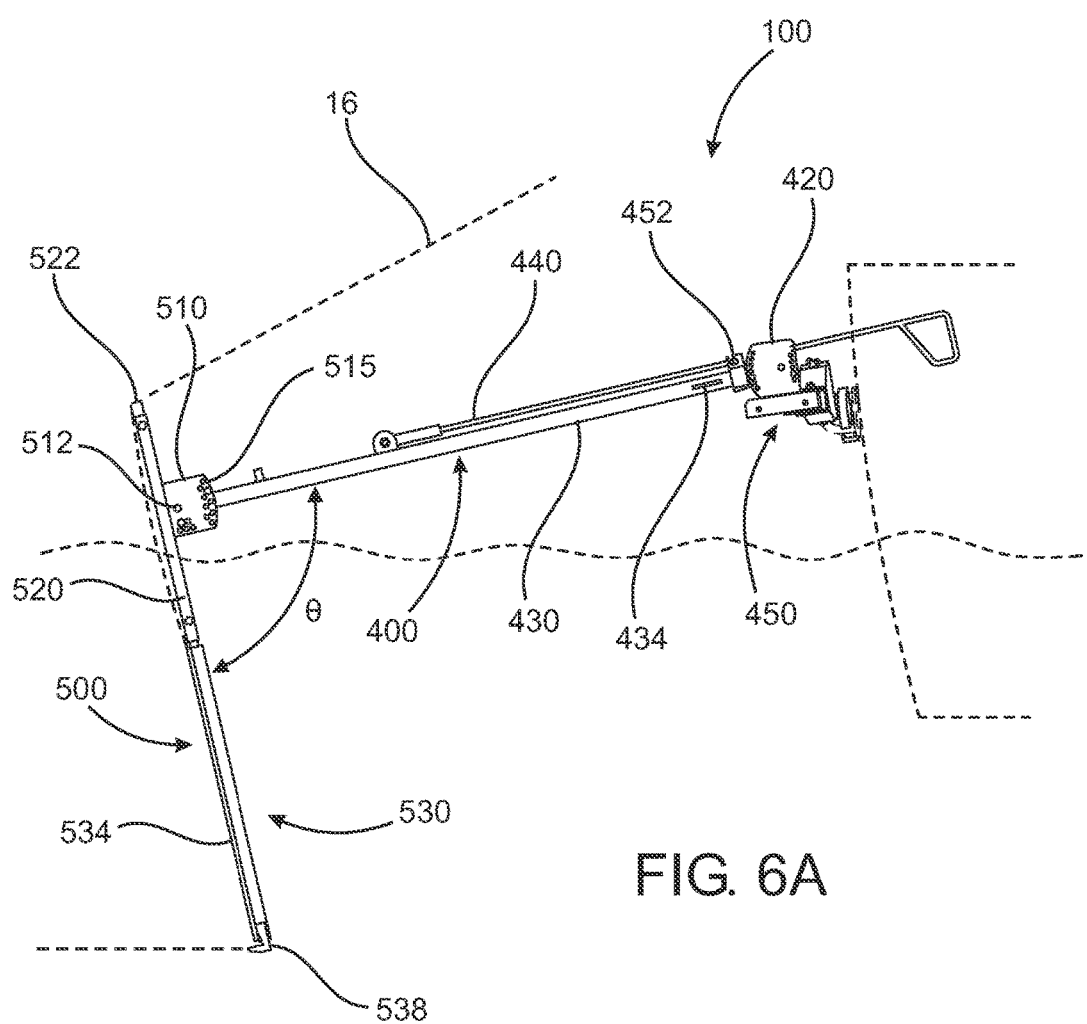
FIG. 6A is a side elevation of the embodiment of the trolling assembly in accordance with FIG. 6 disposed in one alternate operative position relative to a boat.

With reference to the illustrative embodiment of FIG. 6A, an alternate operative orientation of a shield assembly 500 relative to a boat in accordance with the present invention is presented. As shown in FIG. 6A, the shield assembly 500 is disposed in an angled operative position relative to the boat, and more specifically, the shield assembly 500 forms an acute angle θ relative to the second positioning assembly 400. In at least one embodiment, the acute angle θ is between about 90 degrees and about 50 degrees. In at least one further embodiment, the acute angle θ is between about 80 degrees and about 60 degrees. As such, the shield assembly 500 is oriented so as to extend upwardly from its trailing end and outwardly away from the stern of the boat while it is disposed in the operative orientation of FIG. 6A.

Therefore, it will be appreciated by those of skill in the art that while the trolling assembly 100 is disposed in the alternate operative orientation as shown in FIG. 6A and pulled through a body of water, seaweed and any other debris contacting the shield assembly 500, and more in particular, the shield mechanism 530, will be forced upwardly along the shield mechanism 530 towards the surface of the body of water, thereby preventing any engagement or entanglement with the portion of the fishing line 16 extending outwardly from the release member 538 at the trailing end of the shield assembly 500.

Looking further to FIGS. 6 and 7, the interconnection mechanism 510 of the shield assembly 500 comprising a fourth pivot member 512 about which the shield assembly 500 moves in relation to the second positioning assembly 400. Further, the interconnection mechanism 510 comprises a shield deployment stop 515 that is structured and disposed to restrict the movement of the shield assembly 500 beyond a predetermined position when deployed in a trolling position. Furthermore, the interconnection mechanism 510 contains a shield deployment array 514 comprised of a plurality of shield deployment apertures 514'. The shield deployment array 514 is used to selectively position the location of a shield deployment stop 515, which may be placed through any corresponding pairs of the plurality of the shield deployment apertures 514' and is structured and disposed to facilitate disposition of the shield deployment arm 520 into each of a plurality of trolling positions, e.g., the shield deployment arm 520 may be disposed so as to form an acute angle θ between the second positioning assembly 400 and the shield assembly 500, as shown in FIG. 6A. The shield deployment stop 515 may be a bar, bolt or other structural material that will restrict the movement of the shield assembly 500 relative to the second arm 430 of the second positioning assembly 400 as is shown in FIG. 7. As can be appreciated, the position in which the shield assembly 500 is deployed will, in conjunction with the placement of the first positioning assembly 300 and the second positioning assembly 400, determine the depth at which the shield mechanism 530, and as such, the portion of the fishing line 16, is deployed for trolling. Accordingly, as is seen from the foregoing, the trolling assembly 100 is adjustable at a number of points and is positionable in a multitude of directions in order to essentially custom fit the trolling assembly 100 to a particular boat 10 or other aquatic craft to maximize trolling effectiveness.

In one embodiment, the shield mechanism 530 comprises a shield support arm 532 which includes at least one shield member 534 disposed in an at least partially overlying relation to a shield channel 536 formed therebetween. In at least one embodiment, the shield support arm 532 and the shield member 534 comprise a unitary construction, however, in at least one further embodiment, the shield support arm 532 and the shield member 534 comprise separate pieces which are subsequently attached to one another. In yet another embodiment, the shield mechanism 530 comprises a shield member support 533, as illustrated in FIG. 11, structured to receive at least a portion of a shield member 534 therein. As before, the shield support arm 532 and the shield member support 533 may comprise a unitary construction or, as illustrated in FIG. 11, the shield support arm 532 and the shield member support 533 comprise separate pieces attached to one another. In at least one embodiment, the shield support arm 532 and shield member support 533 are formed of a structurally rigid and corrosion resistant material such as stainless steel, or other such metal, alloy, composite, synthetic material, etc., that provides similar structural support for the trolling assembly 100 as stainless steel, while being able to withstand corrosive water and/or saltwater environments. With regard to the other components of the present trolling assembly 100, they may also be manufactured of stainless steel, metal, alloy, composite, synthetic material, etc., once again, provided the material provides sufficient structural support, rigidity, and corrosion resistant properties.

As noted above, one or more shield member 534 may be attached directly to the shield support arm 532, at least partially defining the shield channel 536 therebetween. In one other embodiment, a shield member support 533 is first attached to the shield support arm 532, and at least one shield member 534 is attached to the shield member support 533. In the illustrative embodiment of FIG. 11, the shield member support 533 comprises a U-shaped configuration defining a support channel 533' therein, and the shield members 534 are attached to the shield member support 533 in the interior of the U-shaped support channel 533'. Additionally, in at least one embodiment, the shield support arm 532 has an aerodynamic shape, such as a tapered edge 532' along one side as illustrated in FIG. 11, the tapered edge 532' being structured and disposed to face the direction of trolling a bait or lure, such that any water-borne debris will contact the tapered edge 532' and be deflected therefrom, without contacting and entangling the fishing line 16 disposed at least partially within the shield channel 536 on the side of the shield mechanism 530 opposite the direction of trolling.

As noted above, in at least one embodiment, the shield mechanism 530 comprises at least one shield member 534 which is disposed in at least partially overlying relation to the shield channel 536, and is structured to releasably retain a portion of the fishing line 16 within the shield channel 536 while trolling. The shield member 534 comprises a material of construction which readily permits the fishing line 16 to release from the shield channel 536 upon application of sufficient force, such as the force from the strike of the fish. More in particular, the shield member 534 may be constructed of a resilient material such as rubber, a sturdy flexible plastic, or other pliable material which comprises sufficient structural integrity to retain and protect the fishing line 16 therein while trolling, and yet, which will flex, bend and/or give to the force on the fishing line 16 from the striking force of a fish, thereby permitting the fishing line 16 to pass through or around the shield member 534 and escape from the shield channel 536, such that the fishing line 16 is free, and the angler may fight the fish in a normal, unimpeded manner.

In one further embodiment, the shield mechanism 530 comprises a plurality of shield members 534 which are cooperatively structured and disposed to create a shield channel 536 therebetween, as shown in more detail in FIG. 11. In particular, the outwardly extending edges of the shield members 534 may nearly touch or even partially overlie one other, thus creating and defining a shield channel 536 therebetween in which the fishing line 16 is releasably retained and protected. Moreover, and as above, at least a portion of each shield member 534 comprises or is constructed of a flexible, resilient, and/or pliable material. Of course, it is contemplated that the present trolling assembly 100 may comprise a shield mechanism 530 without any shield member 534, wherein the fishing line 16 is simply positioned in the interior of the U-shaped support channel 533' itself while trolling.

Moreover, the shield mechanism 530 is structured such that the shield channel 536 opens in a direction opposite of the trolling direction when the shield mechanism 530 is disposed in an operative orientation. More in particular, as the boat 10 moves through the water in a forward, trolling direction, a wake is propagated in the water in an opposite, trailing direction. The shield mechanism 530 of the shield assembly 500 is structured such that when disposed in an operative orientation for trolling, the shield support arm 532 faces the forward, trolling direction such that the tapered edge 532' is presented first to cut through the water and any water-borne debris. Further, one or more shield member 534 is disposed on the opposite side of the shield support arm 532, such that water and water-borne debris flow along and around the side of the shield member(s) 534 while trolling. Further, the shield channel 536 is structured and disposed to open in the trailing direction and release the portion of the fishing line 16 therefrom upon the strike of a fish. Accordingly, as the boat 10 moves through the water in a trolling direction, water and water-borne debris will first contact the tapered edge 532' of the shield support arm 532, and be deflected to one side or the other of the same, thereby preventing contact with the portion of the fishing line 16 disposed and protected in the shield channel 536 by the shield member(s) 534.

By way of further example, the shield mechanism 530 is structured and disposed such that when deployed in an operative orientation while trolling, the fishing line 16 is maintained along the trailing side of the trolling assembly 100 and any plant matter, water-born debris, or other particulate which contacts and/or accumulates on the leading edge of the shield support arm 532 will not become entangled with the portion of the fishing line 16, either while trolling or upon release of the fishing line 16 from the trolling assembly 100 following the strike of a fish. As such, the trolling assembly 100 of the present disclosure allows for continuous and efficient trolling without the need to stop to remove or untangle debris from the fishing line 16. Further, the present trolling assembly 100 minimizes the occurrences of plant matter or other water-borne debris from becoming entangled in the fishing line 16 prior to a strike of a fish, and thus, minimizes the debris in the line while fighting the fish back to the boat.

The shield mechanism 530 also comprises a release member 538 that is structured to releasably maintain a portion of the fishing line 16 below the surface of a body of water while trolling. This release member 538 is disposed so that the portion of the fishing line 16 is maintained at a predetermined depth below the surface of the water while trolling. In one embodiment, the release member 538 is adjustable such that the force of a strike required to free the fishing line 16 from the release member 538 may be preset, such as, by way of example only, in a range of 1 to 30 pounds-force. In the illustrative embodiment of FIG. 10, the release member 538 is attached to an end of the shield support arm 532 so that when the trolling assembly 100 is deployed in an operative position, the release member 538, and the portion of the fishing line 16, are maintained at a desired depth. Thus, the depth of the fishing line 16 below the surface of the body of water while trolling is achieved via cooperative adjustment and positioning of the first arm 310, the second arm 430, and the shield deployment arm 520 into a desired and predetermined deployed trolling orientation.

Figure 12:
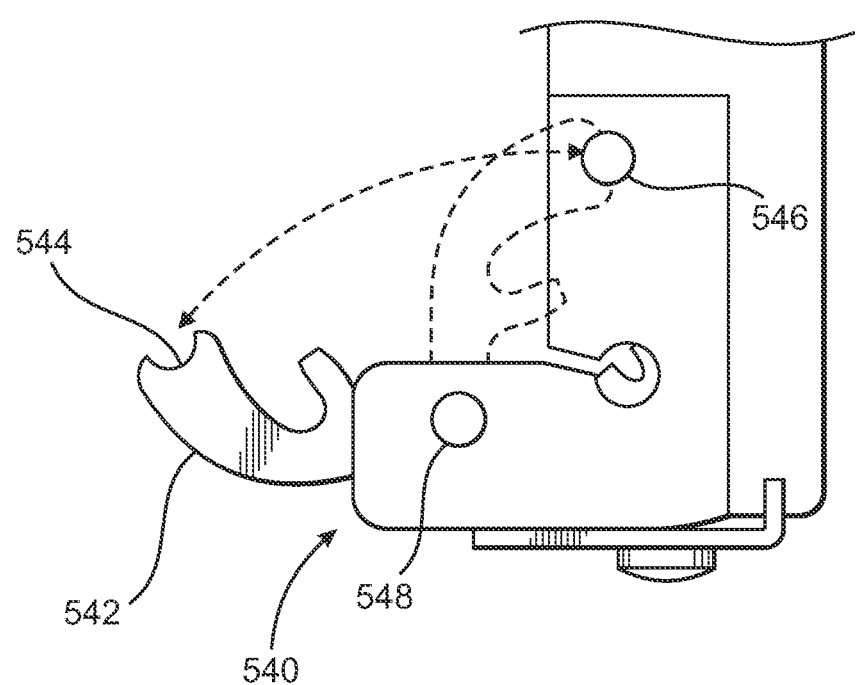
FIG. 12 is an elevation of another illustrative embodiment of a release member in accordance with the present invention.

FIG. 12 is illustrative of one further embodiment of a release member generally shown as 540. In this embodiment, the release member 540 comprises a release arm 542 which is disposable between an open orientation, as shown in solid lines in FIG. 12, and a closed orientation, as depicted in dashed lines in FIG. 12. As will be appreciated, a portion of a fishing line may be releasably retained in the release member 540 by the release arm 542, while the release arm 542 is disposed in a closed orientation.

In one embodiment, the release arm 542 is movably mounted at one end via a pivot pin 548, and having a notch or catch 544 at its oppositely disposed end. The catch 544 is dimensioned to engage a catch pin 546 while the release arm 542 is disposed in the closed orientation. The catch 544 engages the catch pin 546, such as by way of example, via a friction fit, thereby serving to retain the release arm 542 in the closed orientation until such time as sufficient force is applied to a fishing line extending therethrough, such as, from the strike of a game fish.

As further shown in the embodiments of FIGS. 6, 10, and 11, the shield assembly 500 includes a shield deployment arm 520 attached via the interconnection mechanism 510. The shield deployment arm 520 comprises a guide member 522 structured and positioned to receive and guide a portion of the fishing line 16 from the fishing rod 12, through the shield channel 536, and to the release member 538. The guide member 522 may comprise a slot 524 to facilitate the guiding of the portion of the fishing line 16 therethrough. In at least one embodiment, the slot 524 comprises a bump, ridge, or similar structure therein which is structured to releasably retain the portion of the fishing line 16 therein while trolling.

As described herein, the shield assembly 500 of the present trolling assembly 100 is structured to guide and releasably retain a portion of the fishing line 16 from the boat 10 into a predetermined position in the water during trolling, as is best depicted in FIG. 6. Specifically, the portion of the fishing line 16 is routed first through the guide member 522, then down along the shield deployment arm 520, through the shield mechanism 530, more in particular, through the shield channel 536 defined by the shield members 534, and, finally, through the release member 538. Upon the strike of a fish, the corresponding force effects the release of the fishing line 16 from the release member 538, and subsequently, a portion of the fishing line 16 is released from the shield mechanism 530 and the guide member 522, such that the fisherman can fight the fish free of and unimpeded by the trolling assembly 100 altogether.

Turning attention now to FIGS. 6 through 9, the trolling assembly 100 is positionable into a plurality of operative positions, as well as a plurality of retracted positions. For instance, the trolling assembly 100 may be deployed in a retracted position in order to attach a portion of a fishing line 16 having a bait or lure secured to one end. Once the portion of the fishing line 16 has been set through the guide member 522, shield channel 536, and release member 538, the trolling assembly 100 is simply deployed from a retracted position into an operable position in order to begin trolling. As can be appreciated, the trolling assembly 100 of the present disclosure therefore obviates the need to cast in the traditional manner. Moreover, once the fishing line 16 is released from the trolling assembly 100, the trolling assembly 100 may be quickly and easily moved from an operative position into a retracted position with one hand, to prevent interference with the fisherman fighting a fish, and to permit the fishing line 16 to be reset. FIGS. 6 through 9 depict the trolling assembly 100 in various stages as it is moved between operative and retracted orientations.

Specifically, FIG. 6 shows one embodiment of the trolling assembly 100 in an operative, deployed position. In order to move the trolling assembly 100 from such a deployed orientation to a retracted orientation, a deployment mechanism 440 is employed. More in particular, and with reference to FIG. 7, the deployment mechanism 440 includes a deployment arm 441 having a handle 443 at one end, an opposite distal end 444, and a shaft 442 disposed therebetween having a retention pin 445 mounted thereto. The deployment arm 441 is connected to the second arm 430, and is movable in relation thereto. In at least one embodiment, the deployment arm 441 is movable between the deployed position and the retracted position about a third pivot member 449.

FIG. 6 also illustrates the deployment mechanism 440 in an operative locked orientation, as described above with reference to the locking mechanism 450, such that it will not interfere with the fisherman during trolling. However, and as shown in FIG. 7, the deployment mechanism 440 may be released from the locked orientation to permit the trolling assembly 100 to be disposed into the retracted position. Of course, it should be noted that as shown in FIG. 7, the trolling assembly 100 is still disposed in a deployed orientation. In order to move the deployment mechanism 440 out of the locked orientation, the handle 443 is engaged and pressure is applied, which is transferred through the shaft 442, and to the biasing mechanism 448, thereby moving the deployment arm 441 towards the biasing mechanism 448 and freeing the retention pin 445 form the retention channel 456 of the locking member 452. In one embodiment, the biasing mechanism 448 comprises a spring loaded piston, while in at least one other embodiment, a pneumatic piston may be employed. Once the deployment arm 441 is freed from the locking member 452, the deployment arm 441 may then be moved to facilitate the movement of the trolling assembly 100 between deployed and retracted orientations.

Figure 8:
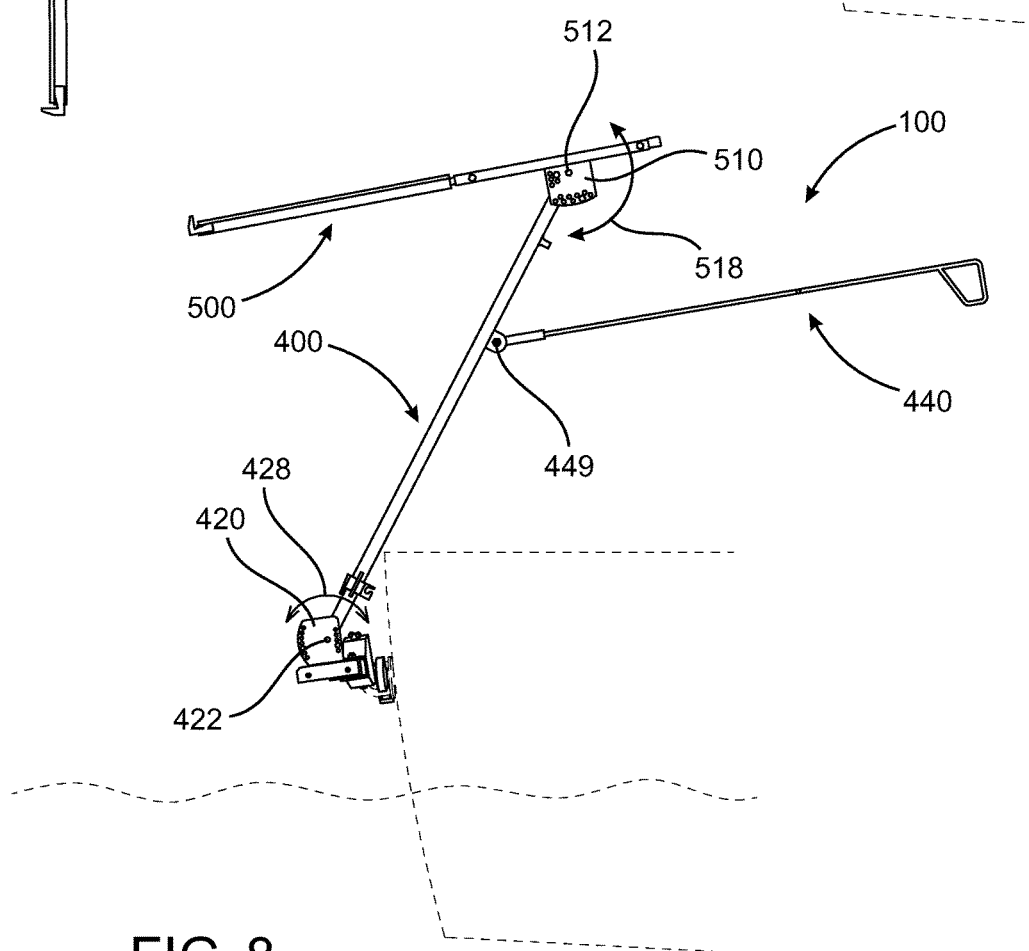
FIG. 8 is a side elevation of the embodiment of the trolling assembly of FIG. 6 partially retracted from the body of water.

Turning now to FIG. 8, once the deployment mechanism 440 is free of the locking mechanism 450, the deployment mechanism 440 is utilized to move the trolling assembly 100 from an operative deployed orientation to a retracted orientation, via a simple pulling force on the deployment mechanism 440 by a user. This movement may occur preferably as a single smooth and continuous motion, although it is contemplated it may also occur through a series of discreet steps. FIG. 8 shows one example of an intermediate position between a deployed position and a retracted position. As the trolling assembly 100 is repositioned from a deployed orientation to a retracted orientation, the deployment arm 441 is movable with respect to the second arm 430 of the second positioning assembly 400. Specifically, the third pivot member 449 allows the deployment arm 441 to pivot as the trolling assembly 100 is either pulled back into a retracted position or conversely pushed from a retracted position into a deployed or operative position.

As also as shown in FIG. 8, as the trolling assembly 100 moves between an operative position and a retracted position, the shield assembly 500 will also move with relation to the second arm 430 of the second positioning assembly 400, specifically, the shield assembly 500 begins to move towards the second positioning assembly 400. This motion is indicated by fourth directional arrow 518 in FIG. 8 and occurs via a pivoting motion around fourth pivot member 512. Similarly, the second positioning assembly 400 is concurrently moving with relation to the boat 10, as indicated by third directional arrow 428 in FIG. 8 which illustrates the second positioning assembly 400 moving about the second pivot member 422. However, it should be noted that the pivoting motion is merely one example of the movement of the respective components of the trolling assembly 100 between deployed and retracted positions.

FIG. 9 shows the trolling assembly 100 in a fully retracted position. Specifically, in the retracted position, the second positioning assembly 400 extends alongside or adjacent to one side of the boat 10, rather than extending away from the boat 10 as in the deployed position. Moreover, in the retracted position, the deployment arm 441 extends through a portion of the interconnection mechanism 510 of the shield assembly 500, as shown in FIG. 9, rather than through the portion of the support member 420 of the second positioning assembly 400 when in a deployed orientation, as shown best in FIG. 1. Further, the second arm 430 comprises a retention member 432 that is structured to receive at least a portion of the deployment arm 441, such as the shaft 442, in order to releasably retain the deployment mechanism 440 in place in a retracted position.

In addition, the interconnection mechanism 510 also contains a shield retraction array 516, which may be comprised of a plurality of shield retraction apertures 516'. The shield retraction array 516 functions similarly to the shield deployment array 514 discussed previously, except that the shield retraction array 516 applies to positioning and/or restricting movement of the shield assembly 500 in relation to the second positioning assembly 400 when in a retracted position. This may be achieved by placing a shield retraction stop 517 through a corresponding pair of the plurality of shield retraction apertures 516' at a desired location in order to affect the angle of the shield assembly 500 in a retracted position. In particular, the shield assembly 500 may be positioned substantially congruent with the second positioning assembly 400 when in a retracted position, as is shown in FIG. 9, or it may rest at an angle to the second positioning assembly 400. This angle will be determined by the placement of the shield retraction stop 517 within the shield retraction array 516. Moreover, when in the retracted position, the trolling assembly 100 is relatively or substantially adjacent to the fishing rod 12 as is shown in FIG. 9 and therefore, allows for the ease of setting or resetting the fishing line 16 onto the trolling assembly 100.

As disclosed thus far, the trolling assembly 100 of the present disclosure has been mountable to a boat 10 or other aquatic craft, but it need not be. Indeed, the trolling assembly 100 need only comprise a first positioning assembly 300, a second positioning assembly 400, and a shield assembly 500. Furthermore, it is contemplated that multiple trolling assemblies 100 may be used simultaneously in conjunction with a single boat 10. As the trolling assembly 100 is adjustable at a number of different points, the position of its component parts can be adjusted and thereby ensure that even if multiple trolling assemblies 100 are being implemented to troll multiple fishing lines 16 at the same time. As such, the positionable aspects enable multiple trolling assemblies 100 to be used at the same time with minimal risk of the lines becoming entangled. As the trolling assemblies 100 can be positioned at different first and second spaced relations to the boat 10, the shield assemblies 500 of each can also be positioned in different deployment orientations to permit the different trolling assemblies 100 to reach different predetermined depths during trolling, thereby obviating the risk of having the multiple lines become entangled.

Since many modifications, variations and changes in detail can be made to the described embodiments of the present disclosure, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A trolling assembly for use in combination with a fishing line and structured to protect at least a portion of the fishing line from water-borne debris while trolling in a body of water from a boat, said trolling assembly comprising:
a mounting assembly removably securable to the boat,
a first positioning assembly releasably attachable to said mounting assembly,
a second positioning assembly connected to the first positioning assembly,
a shield assembly connected to said second positioning assembly, said shield assembly including a shield mechanism comprising a shield support arm extendable in a downward direction to a predetermined depth below a surface of the body of water at which the fishing line is deployed, and
at least one shield member attached along a majority of a length of said shield support arm and disposed in an at least partially overlying relation to a shield channel, said shield channel open in a direction opposite to a direction of trolling while said shield assembly is deployed in an operative orientation, said shield assembly is positioned so as to form an acute angle between said shield assembly and said second positioning assembly, an upper end of said shield mechanism remains above the surface of the body of water while a lower end of said shield mechanism remains below the surface of the body of water, and said shield assembly is oriented so as to extend upwardly from a trailing end of said shield assembly and outwardly away from a stern of said boat when said shield mechanism is deployed in said operative orientation while trolling.

2. The trolling assembly of claim 1 wherein said at least one shield member comprises a plurality of shield members cooperatively structured and disposed in an at least overlying relation to one another, said plurality of shield members securely affixed along said majority of said length of said shield support arm and defining said shield channel therebetween.

3. The trolling assembly as recited in claim 2 wherein said plurality of shield members releasably retain a portion of the fishing line within said shield channel while trolling.

4. The trolling assembly of claim 2 wherein at least a portion of each of said shield members comprises a resilient material of construction.

5. The trolling assembly as recited in claim 1 further comprising a release member affixed to said lower end of said shield mechanism.

6. The trolling assembly as recited in claim 5 wherein said release member releasably retains a portion of the fishing line below the surface of the body of water while trolling.

7. The trolling assembly as recited in claim 6 wherein said release member releases the fishing line from said trolling assembly upon a strike of a fish.

8. The trolling assembly as recited in claim 1 wherein said shield mechanism protects a portion of the fishing line disposed below the surface of the water and within said shield channel from water-borne debris while trolling.

9. A trolling assembly for use in combination with a fishing line and structured for trolling the fishing line in a body of water from a boat, said trolling assembly comprising:
a mounting assembly removably securable to the boat,
a first positioning assembly releasably attachable to said mounting assembly,
a second positioning assembly interconnected to said first positioning assembly,
a shield assembly connected to said second positioning assembly, said shield assembly comprising a shield mechanism, wherein said shield mechanism comprises an elongated shield support arm having an elongated leading surface forming a tapered edge to engage and divert water-borne debris around said shield mechanism,
said elongated shield support arm comprising an elongated shield channel facing opposite a direction of trolling while said shield assembly is deployed in an operative orientation, said elongated shield channel comprising an open upper end and an open lower end, and
a release member affixed to said shield mechanism below said open lower end of said elongated shield channel, said release member receiving the fishing line passing through said open lower end of said elongated shield channel and releasably maintaining the fishing line at a predetermined depth below a surface of the body of water in which the fishing line is deployed, said shield assembly is disposed in a downward directed orientation and traverses the surface of the body of water while deployed in said operative orientation, said shield assembly is positioned so as to form an acute angle between said shield assembly and said second positioning assembly, said open upper end of said elongated shield channel remains above the surface of the body of water while said open lower end of said elongated shield channel remains below the surface of the body of water, and said shield assembly is oriented so as to extend upwardly from a trailing end of said shield assembly and outwardly away from a stern of said boat when said shield mechanism is deployed in said operative orientation while trolling.

10. The trolling assembly of claim 9 wherein said first positioning assembly being adjustable to facilitate positioning a portion of the fishing line in a first predetermined spaced relation to the boat.

11. The trolling assembly of claim 10 wherein said second positioning assembly is positionable to facilitate positioning the portion of the fishing line in a second predetermined spaced relation to the boat.

12. The trolling assembly of claim 9 wherein said first positioning assembly further comprises an extension arm moveably connected thereto.

\* \* \* \* \*